US010458804B2

(12) United States Patent
Schmidt et al.

(10) Patent No.: US 10,458,804 B2
(45) Date of Patent: Oct. 29, 2019

(54) METHODS OF OBTAINING AND USING POINT OF INTEREST DATA

(71) Applicant: TomTom Traffic B.V., Amsterdam (NL)

(72) Inventors: Gunnar Schmidt, Berlin (DE); Antoine Carl Van der Laan, Lelystad (NL)

(73) Assignee: TOMTOM TRAFFIC B.V., Amsterdam (NL)

(*) Notice: Subject to any disclaimer, the term of this patent is extended or adjusted under 35 U.S.C. 154(b) by 323 days.

(21) Appl. No.: 15/314,011

(22) PCT Filed: May 26, 2015

(86) PCT No.: PCT/EP2015/061584
§ 371 (c)(1),
(2) Date: Nov. 25, 2016

(87) PCT Pub. No.: WO2015/181165
PCT Pub. Date: Dec. 3, 2015

(65) Prior Publication Data
US 2017/0205242 A1 Jul. 20, 2017

(30) Foreign Application Priority Data
May 26, 2014 (GB) .................. 1409308.2

(51) Int. Cl.
*G08G 1/096* (2006.01)
*G01C 21/34* (2006.01)
(Continued)

(52) U.S. Cl.
CPC ......... *G01C 21/3476* (2013.01); *G01C 21/32* (2013.01); *G01C 21/3679* (2013.01);
(Continued)

(58) Field of Classification Search
None
See application file for complete search history.

(56) References Cited

U.S. PATENT DOCUMENTS

| 8,484,151 | B1 | 7/2013 | Lookingbill |
| 8,700,321 | B2 | 4/2014 | Studzinski |
| (Continued) | | | |

FOREIGN PATENT DOCUMENTS

| EP | 2610782 A1 | 7/2013 |
| WO | 0155744 A2 | 8/2001 |
| (Continued) | | |

OTHER PUBLICATIONS

Search Report dated Nov. 21, 2014 for GB Application No. 1409308.2.
(Continued)

*Primary Examiner* — Abby Y Lin
*Assistant Examiner* — Kenny A. Taveras

(57) ABSTRACT

Data indicative of a plurality of duration times is obtained, each duration time relating to a dynamic POI of a set of a plurality of dynamic POIs that have a similar location, and are of similar type. Each duration time is in respect of a given time. The data indicative of each duration time is representative of a difference between a time at which the dynamic POI was in an active state and a time at which the dynamic POI was in an inactive state. The obtained duration time data and the associated time data are used to obtain a duration time function indicative of a variation in duration time with respect to time. The duration time function is associated with data indicative of a given geographic location.

20 Claims, 7 Drawing Sheets

(51) Int. Cl.
  *G06F 16/29*    (2019.01)
  *H04W 4/021*    (2018.01)
  *G01C 21/32*    (2006.01)
  *G01C 21/36*    (2006.01)
  *G08G 1/01*     (2006.01)
  *G08G 1/0967*   (2006.01)
  *H04W 4/04*     (2009.01)

(52) U.S. Cl.
  CPC ..... *G01C 21/3685* (2013.01); *G01C 21/3691* (2013.01); *G01C 21/3694* (2013.01); *G01C 21/3697* (2013.01); *G06F 16/29* (2019.01); *G08G 1/012* (2013.01); *G08G 1/0112* (2013.01); *G08G 1/0129* (2013.01); *G08G 1/0141* (2013.01); *G08G 1/096716* (2013.01); *G08G 1/096741* (2013.01); *G08G 1/096775* (2013.01); *H04W 4/021* (2013.01); *H04W 4/046* (2013.01)

(56) References Cited

U.S. PATENT DOCUMENTS

| | | |
|---|---|---|
| 2012/0303272 A1 | 11/2012 | Studzinski |
| 2014/0058711 A1* | 2/2014 | Scofield ................ G06Q 10/04 703/6 |
| 2014/0278081 A1* | 9/2014 | Iwuchukwu ....... G01C 21/3679 701/519 |

FOREIGN PATENT DOCUMENTS

| | | |
|---|---|---|
| WO | 2007024365 A2 | 3/2007 |
| WO | 2011023719 A1 | 3/2011 |
| WO | 2013132031 A1 | 9/2013 |
| WO | 2013132033 A1 | 9/2013 |
| WO | 2014150197 A1 | 9/2014 |

OTHER PUBLICATIONS

International Search Report dated Jul. 14, 2015 for International Application No. PCT/EP2015/061584.

* cited by examiner

METHODS OF OBTAINING AND USING POINT OF INTEREST DATA

CROSS-REFERENCES TO RELATED APPLICATIONS

The present application is a National Stage of International Application No. PCT/EP2015/061584, filed on May 26, 2015, and designating the United States, which claims benefit to United Kingdom Patent Application 1409308.2 filed on May 26, 2014. The entire content of these applications is incorporated herein by reference.

FIELD OF INVENTION

The present invention, at least in some aspects, relates to methods and systems of obtaining and using data relating to dynamic points of interest (POIs), such as speed limit enforcement devices. In particular, although not exclusively, the invention relates to obtaining and using information relating to a duration time of a point of interest (POI) that is dynamical in nature. A dynamic POI is a POI which has at least one attribute which changes over time. The dynamic POI is therefore a POI which may be in different states at different times. The dynamic POI may be arranged to be in at least first and second states at different times, e.g. active and inactive states. A dynamic POI may be considered to have a duration time in a given state corresponding to the time that the POI remains in the state. For example, a duration time in an active state would be the time that the POI remains in the active state after activation.

BACKGROUND TO THE INVENTION

Portable navigation devices (PNDs) that include GNSS (Global Navigation Satellite Systems) signal reception and processing functionality are well known and are widely employed as in-car or other vehicle navigation systems. Such devices include a GNSS antenna, such as a GPS antenna, by means of which satellite-broadcast signals, including location data, can be received and subsequently processed to determine a current location of the device. The device may also include electronic gyroscopes and accelerometers which produce signals that can be processed to determine the current angular and linear acceleration. The determined acceleration may then be used in conjunction with location information derived from the GPS signal to determine the velocity and relative displacement of the device and thus vehicle in which it is typically mounted. Such sensors are most commonly provided in in-vehicle navigation systems, but may also be provided in the PND itself.

In recent years, GPS has also been used in systems to warn drivers of speed traps, enforcement cameras and road hazards, such as school zones, accident black spots, etc. In such systems, a device having a GPS antenna and access to a database containing the location of speed traps, accident black spots, etc is typically provided in a vehicle. The device is configured to provide warnings to a driver when the vehicle, using the location information derived from the GPS signal, is in the vicinity of one of the locations stored in the database. One such system is described, for example, in WO 01/55744 A2.

As will be appreciated by those skilled in the art, one of the important aspects of such systems is the accuracy and freshness of the information in the database. For example, it is undesirable to provide a warning to a user of a speed camera that is no longer present on the stretch of road, or to incorrectly indicate the speed limit on a stretch road associated with a speed camera in the database. In an effort to improve accuracy and freshness of such data, it is known to collect and utilise reports from drivers and other users indicating the presence or absence of speed cameras, and to provide this updated information to other members of the community in a real-time manner.

An example of one such system is the Trapster® application for mobile devices. In this application, all users of the app are asked to report or validate the status of speed traps, enforcement cameras and the like. As result of these reports, a digital map can be shown to a user with various icons and colours representing different trap types, and in some cases their associated confidence levels. For example: a green trap icon is displayed to indicate the presence of an unverified trap; a yellow trap icon is displayed to indicate that a trap has been verified by another user; a red trap icon is displayed to indicate that a trap has been verified by multiple users, and thus has the highest confidence level associated with it. The application also allows users to report relatively short-lived hazards, such as: police traps, e.g. an active sighting of a police speed trap, or a police vehicle currently observing traffic; construction zones, e.g. road works; brush fires; road closures; children at play; icy roads; etc. These hazards are shown to other users, again by means of an icon on the digital map, but will automatically expire after a certain period of time following the last positive report from a user confirming its presence. The particular period of time that elapses before a hazard is no longer shown to a user varies based on the type of hazard. For example, a police trap expires after one hour, road closures after six hours and a construction zone after five days.

Despite the improvements in speed trap and enforcement camera warning systems through the use of so-called active community feedback, e.g. as described above in relation to the Trapster® application, there remains scope for further improvement, and in particular with respect to the accuracy of the data in the associated database. More generally, there is a need to provide improved methods for obtaining and using data regarding the duration time information for dynamic POI. Current techniques tend to assign a fixed duration to a given dynamic POI dependent upon factors such as country, functional road class associated with the POI, POI type etc. However, it has been found that this may not adequately reflect durations of POI in practice.

SUMMARY OF THE INVENTION

In accordance with a first aspect of the invention there is provided a method of obtaining duration time data relating to dynamic points of interest (POIs), the method comprising:

obtaining data indicative of a plurality of duration times for a set of one or more dynamic POIs, each duration time relating to a dynamic POI of the set and being in respect of a given time, wherein the data indicative of each duration time is representative of a difference between a time at which the dynamic POI was in a first state and a time at which the dynamic POI was in a second state;

using the obtained data indicative of the plurality of duration times to obtain a duration time function indicative of a variation in duration time with respect to time; and associating data indicative of the duration time function with data indicative of a given geographic location.

The present invention also extends to a system for carrying out the method of obtaining duration time data relating to dynamic POIs in accordance with any of the aspects or embodiments of the invention.

In accordance with a second aspect of the invention there is provided a system for obtaining duration time data relating to dynamic POIs, the system comprising:

means for obtaining data indicative of a plurality of duration times for a set of one or more dynamic POIs, each duration time relating to a dynamic POI of the set and being in respect of a given time, wherein the data indicative of each duration time is representative of a difference between a time at which the dynamic POI was in a first state and a time at which the dynamic POI was in a second state;

means for using the obtained data indicative of the plurality of duration times to obtain a duration time function indicative of a variation in duration time with respect to time; and means for associating data indicative of the duration time function with data indicative of a given geographic location.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. Obtaining processing duration time data in accordance with the invention in any of its aspects or embodiments, may, and preferably are, implemented by a processing resource of a server. The method is preferably carried out by a server. Thus, the system is, in preferred embodiments a server. The means for carrying out any of the steps of the method may comprise a processing resource of a server.

In accordance with the invention, therefore, a duration time function is obtained that is indicative of the way in which duration time varies with respect to time based upon duration time data obtained in respect of at least one set of one or more POIs. This duration time function is based upon historical data indicative of duration times associated with POI(s) of the set. The data indicative of each duration time is representative of a difference between a time at which the POI was in a first state and a time at which the POI was in a second state, and is in respect of a given time. The resulting duration time function is then associated with data indicative of a geographic location. The geographic location is a location to which the duration time function is considered applicable, i.e. such that the duration time function may be considered to at least reasonably approximate the variation in duration time with respect to time that will be exhibited by at least some dynamic POIs associated with the location. When a new dynamic POI is subsequently created, an applicable duration time function for the POI may be selected based upon the location of the dynamic POI, e.g. a duration time function associated with a geographic location that includes the location of the dynamic POI may be selected. A duration for the new POI may then be identified using the duration time function for an applicable time, e.g. a current time or planned activation time, etc. It will be appreciated that, as discussed below, multiple duration time functions may be associated with a particular location, being applicable to different types of dynamic POI associated with the location. Thus a particular duration time function may not be applicable to all dynamic POI associated with the location, but rather to at least some dynamic POI associated with the location that have certain attributes.

In contrast with prior art techniques, in which a fixed duration time is assigned to a new dynamic POI when created, e.g. based upon one or more attributes of the POI, such as POI type, functional road class of a road with which the POI is associated, country, etc, the present invention recognises that the duration time of a dynamic POI tends to vary based upon time as well as location of the POI. By way of example, a dynamic POI that is a mobile speed limit enforcement device may last for 2 hours at location on a Monday morning at 9 am, while a mobile speed limit enforcement device at the same location on a Tuesday afternoon at 5 pm may last for 3 hours. By obtaining a duration time function indicative of a variation of duration time with respect to time, and associating the function with data indicative of a geographic location to which the duration time function is applicable, the present invention allows more accurate duration time data to be associated with new dynamic POIs, reflecting the variation over time and location which has been found to exist. This may be achieved in a manner efficient of processing and storage resources, by identifying an applicable duration time function from stored duration time function data, e.g. based at least upon location of the new POI, and using the function to retrieve an applicable duration time for the POI based upon time, e.g. a current time or planned activation time.

In accordance with the invention, a single duration time function may be obtained using data indicative of multiple duration times relating to one or more dynamic POIs. Thus, the duration time function is obtained by aggregating data indicative of multiple individual duration times, associated with one or more POIs. The data indicative of duration time for a POI is indicative of a difference between respective times at which the POI was in first and second states. Thus, the duration time data is based upon historical data indicative of the state of a POI. As the duration time data used to obtain the duration time function is based upon actual operation of POIs (at least as understood by the system), this may provide a duration time function that allows a more accurate prediction of duration time for a given time than a purely theoretical prediction.

As will be described in more detail below, in preferred embodiments at least, the present invention obtains a duration time function by analysing historical data indicative of times at which dynamic POIs were in different states. Duration time data from multiple dynamic POIs which may be consider to share or be similar in respect of one or more attributes including at least location may be used to obtain a given duration time function to be associated with a location (which may be selected based upon the locations of the dynamic POIs whose duration time data was used in obtaining the function). The duration time data from the different dynamic POIs may be aggregated to obtain the duration time function. In preferred embodiments at least, by taking into account the operation of multiple dynamic POIs to obtain a particular duration time function, the present invention may allow more accurate duration time data to be obtained without requiring significant amounts of data regarding the operation of a particular dynamic POI. This is in contrast to some prior art techniques in which a fixed duration time is associated with a new dynamic POI, but which is adjusted if data is received indicating that the state of the POI has changed before or after the expected time according to the fixed duration assigned to the POI. In practice, sufficient data relating to the operation of a particular dynamic POI, e.g. based upon received reports, may not always be available to allow duration times assigned to the POI to be appropriately adjusted if they are not accurate.

The term "point of interest" as used herein in relation to the invention in any of its aspects or embodiments takes it usual meaning within the art and thus refers to a permanent or temporary object at a particular location, e.g. point or region, that is of interest to a person or company. A POI may therefore be a building, such as a shop, tourist attraction or the like, or an area such as park. Similarly, a POI may be an object such as a speed limit enforcement device, e.g. a fixed speed camera (either individual cameras or as part of average speed zones), mobile speed camera, etc, or a dynamic advertising space (capable of displaying data sent to it from a remote location).

The present invention in any of its aspects or embodiments is concerned with methods and systems involving dynamic POIs. A "dynamic POI" as used herein refers to a POI that may be considered to have at least one attribute which changes over time. The dynamic POI transitions between at least one pair of states, i.e. first and second states. The dynamic POI may transition at least once between first and second states. It will be appreciated that the dynamic POI may transition only once between the states, i.e. in one direction, and not back again. For example, a dynamic POI may have a defined life, such that it is active, providing a first state, before transitioning, at some point, to an inactive or second state. The POI may then not be reactivated at a subsequent time, e.g. it may be deleted from a database of POI. Other dynamic POIs may repeatedly transition between first and second states. For example, a POI that has transitioned from an active state to an inactive state may subsequently become active again at a later time, and may repeatedly transition between active and inactive states. The first and second states preferably are active and inactive states respectively. However, it is envisaged that a dynamic POI may alternatively or additionally transition between other types of state. For example, a dynamic POI that is a traffic jam may transition between at least one pair of more severe and less severe states. A dynamic POI may be temporary in nature, or at least have properties that change with time. While the invention is described by reference to a dynamic POI that may be in at least first and second states, it will be appreciated that the dynamic POI may additionally have one or more further states. Thus the dynamic POI may have only first and second states, or may have one or more additional states. The steps of the method may be implemented in relation to any additional pair of states.

The present invention in its various aspects and embodiments will be described by particular reference to the case in which the or each dynamic POI is a speed limit enforcement device. However, the principles of the invention can relate to any type or types of dynamic point of interest (POI). For example, the invention may also be applicable to dynamic POIs in the form of parking spaces or areas, traffic jams, electric vehicle charging stations, areas of construction or roadworks, dynamic signage, or areas affected by weather or other environmental conditions, e.g. morning thaw, flooding or black ice. It will be appreciated that these possibilities are merely exemplary, and are not intended to provide an exhaustive list of possible dynamic POIs. In some embodiments the or each dynamic POI is selected from: a speed limit enforcement device; a parking space or area; a traffic jam; an electric vehicle charging station; an area of construction or roadworks; dynamic signage; or an area affected by weather or other environmental condition. Dynamic signage may refer to any electronic display e.g. an information or advertising display. The dynamic signage may be capable of displaying data sent to it from a remote location. The "type" of a dynamic POI as referred to herein may refer to a general or specific class of the POI, e.g. a speed camera or a mobile speed camera.

In embodiments in which a dynamic POI is a speed limit enforcement device, the device can comprise any type of device that can be used to enforce the speed limit assigned to a road, such as a fixed device, e.g. speed camera, red light camera, or a mobile device, such as those contained in parked vehicles or held by law enforcement officers. A speed limit enforcement device may be a standalone camera, or one of a set of multiple cameras that provide an average speed enforcement zone.

A duration time as used herein in relation to the invention in any of its aspects or embodiments refers to a time that a dynamic POI remains in a given state. In preferred embodiments the state is a first state, and preferably an active state. When a new dynamic POI is generated, a duration time is assigned to the POI, which sets the length of time that the POI will remain in a particular state, e.g. an active state. The duration time may be defined with respect to a time of initiation of the particular state, e.g. an activation time.

As described above, a dynamic POI is a POI that transitions between at least one pair of states, being first and second states. Preferably the states are active and inactive states. The definition of active and inactive states may vary depending upon the nature of the POI. In some embodiments an active state is a state in which the POI is considered to be present or operational, and an inactive state is a state in which the POI is considered not to be present or operational. The active and inactive states refer to the state of the device as understood within the system. Of course, this is dependent upon the accuracy of data received by the system, e.g. reports from users or other information, and the device may not have that state in reality.

Where the dynamic POI is a speed limit enforcement device, an active state may be a state indicating that the device is considered to exist or be operational. An inactive state may be a state indicating that the device is considered no longer to exist or be operational. A parking space may be a dynamic POI, wherein an active state indicates that the parking space is considered vacant, and an inactive state indicates that the parking space is considered filled. In other embodiments, weather or other environmental conditions can be considered dynamic POIs. For example, a region of black ice or flooding may be a dynamic POI, wherein an active state indicates the black ice or flooding is considered present, and an inactive state indicates that the black ice or flooding is no longer considered present. In yet other embodiments, traffic jams can also be considered dynamic POIs.

The present invention in accordance with its first and second aspects at least involves obtaining data indicative of a plurality of duration times relating to respective ones of one or more set of one or more dynamic POIs. Various features and embodiments of methods in accordance with the invention will be described in relation to the steps performed in relation to a given set of one or more dynamic POIs. It will be appreciated that any of these steps may equally be performed in relation to one or more further set of one or more dynamic POIs if appropriate to obtain duration times, and a duration time function in respect of the or each further set. This may be carried out, as an example, to provide duration time functions applicable to dynamic POIs having different attributes other than location, e.g. type etc. The way in which the one or more dynamic POIs of a set may be selected will be described in more detail below. In some preferred embodiments the steps of the method are carried out in respect of a plurality of sets of one or more dynamic POIs (and preferably such sets of dynamic POIs comprising a plurality of dynamic POIs) to provide data indicative of a plurality of duration time functions associated with respective locations. These may be stored in a database of duration time functions.

The method of the present invention involves, for at least one set of one or more dynamic POIs, obtaining data indicative of a plurality of duration times, each being in respect of a dynamic POI of the set. This data is used in obtaining a duration time function. In some embodiments the set of one or more dynamic POIs consists of a single dynamic POI. In other embodiments, the set of one or more dynamic POIs comprises a plurality of dynamic POIs.

It will be appreciated that a plurality of duration times may be obtained in respect of a given dynamic POI of the set. This will be the case where the set of dynamic POIs consists of a single POI, or, in some embodiments, where the set of dynamic POIs comprises a plurality of dynamic POIs. This may be applicable where a given type of POI associated with a particular location periodically transitions between states, e.g. between active and inactive states. Where a set of dynamic POIs comprises a plurality of dynamic POIs, data indicative of one or more duration times is obtained for each dynamic POI. Data indicative of a single duration time may be obtained in respect of at least some, or each one of a set of a plurality of dynamic POIs. The term "at least some" herein encompasses one or a plurality. Alternatively or additionally data indicative of a plurality of duration times may be obtained in respect of at least some, or each one of a set of a plurality of dynamic POIs. In some embodiments the method involves obtaining data indicative of a plurality of duration times in respect of each one of a set of a plurality of dynamic POIs. This may allow a more accurate duration time function to be obtained. Considering multiple duration times for a particular dynamic POI may provide a more detailed indication of the variation in operation of the POI over time. However, in embodiments in which duration times are obtained for a set of a plurality of dynamic POIs and used to obtain a duration time function, depending upon the number of dynamic POIs that are considered, there may be sufficient duration time data to obtain an accurate duration time function without necessarily needing to consider multiple duration times for each dynamic POI of the set. Whether a single or multiple duration times are determined for a given dynamic POI will also depend upon the nature of the POI. Some POIs will be active only once, being deleted once becoming inactive. In such cases is it appropriate to obtain only a single duration time. Other POIs may undergo repeated cycles of activation and deactivation, allowing multiple duration times to be obtained.

The method of the present invention involves obtaining data indicative of a plurality of duration times, each relating to a dynamic POI of a set of one or more dynamic POIs that is being considered. The data indicative of a duration time for a given dynamic POI is indicative of a difference between a time at which the POI was in a first state, e.g. an active state, and a time at which the POI was in a second state, e.g. an inactive state.

The method extends to the step of obtaining data indicative of a time at which the or each dynamic POI was in the first state and a time at which the dynamic POI was in the second state that is used in obtaining the data indicative of a duration time for the or each dynamic POI of the set. It is envisaged that this may be carried out by analysing data indicative of at least one time at which each of a plurality of dynamic POIs in a given geographic region were respectively in each of first and second states. Such data may be stored in a database. The method may comprise analysing stored data indicative of at least one time at which each of a plurality of dynamic POIs in a geographic region were in first state and at least one time at which each of the plurality of dynamic POIs in the region were in a second state to obtain the data indicative of time at which each of the one or more dynamic POIs of the set of one or more dynamic POIs were in the first and second states.

In embodiments the method may comprise obtaining the data indicative of the times at which the or each dynamic POI was in the first and second states respectively from a database comprising data indicative of a plurality of dynamic POIs in a geographic region, and, for each dynamic POI, data indicative of at least one time at which the POI was in a first state, and at least one time at which the POI was in the second state. The database may further store data indicative of one or more attribute of each dynamic POI, e.g. location, type, etc. The database may be stored by the server that performs the method of obtaining duration time data in accordance with the invention. In other embodiments, such a database may be stored remotely from the server, but be accessible by the processing resource of the server via suitable communications link. The link may be a wireless link or a wired link or may comprise combinations thereof. Rather than using one database, such data may be stored in more than one database.

In accordance with the invention, each duration time that is determined is in respect of a given time. The time is the time to which the duration time relates. The time to which a duration time relates may be determined by consideration of data indicative of the times that the POI was in the first and second states. Such timing information will be inherent in this data. The method may further comprise determining a time to which the duration time relates, preferably using the data identifying the times at which the POI was in the first and second states. The time may be any suitable reference time determined using the times at which the POI was in the first and second states. The time may be a time at which the dynamic POI was in the first state, or the second state, or a time based upon one or both of those times. In some preferred embodiments the time is a time at which the first state of the POI was initiated e.g. an activation time. The time may be by reference to an absolute time, or a timeslot. The time may be a time of day and/or day of the week, etc, or may be a month of the year, season, etc. The time should be chosen appropriately depending upon the nature of the POI, and the period that is to be used for the duration time function, as discussed below. It will be appreciated that the duration times in respect of which data is obtained in accordance with the invention include duration times in respect of different given times. This enables the duration time function indicative of variation in duration time with respect to time to be obtained.

The duration time data obtained and used in accordance with the invention, and, where applicable, the data indicative of times at which a dynamic POI was in the first and second states used to obtain the duration time data, may be based upon any source or sources of such data. The method may extend to receiving and storing such data. In some embodiments in which the data is obtained from stored data, e.g. a database, the database may be based upon data from any such source or sources. In preferred embodiments the data is based, at least in part, upon user reports. For example, where the dynamic POI is a speed limit enforcement device, it may be determined that the device is in an active state upon receipt of a report from a user. The report may be received from a mobile device associated with the user, e.g. a navigation device. The report may be generated in any suitable manner, e.g. by a user pressing a real or virtual button of a navigation device to automatically generate and transmit a report to a server confirming an active device. In preferred embodiments in which the data is based upon user reports, the user reports may comprise, for the or each dynamic POI, one or more reports indicative of a time at which the POI was in the first state, and one or more reports indicative of a time at which the POI was in the second state, e.g. an active or an inactive state. The reports may be time-stamped. In some embodiments, user reports may be subjected to a verification process before being accepted. This may involve considering the trustworthiness or rating of the user providing the report, or requiring that a report be corroborated, e.g. by another report or source of data before being accepted.

Alternatively or additionally, data regarding the state of a dynamic POI may be obtained from various third parties, such as government data, other companies, newspapers and other journalistic sources, etc. Such data may alternatively or additionally be determined from sources, such as images collected by mobile mapping vehicles, or mobile devices having an appropriate camera feed. In yet other arrangements, such data may be alternatively or additionally inferred from changes in the speed of individual vehicles or collections of vehicles in the vicinity of a location of the POI. For example, and as described in WO 2011/023719 A1, the entire contents of which is incorporated herein by reference, mobile devices carried by vehicles can detect a particular speed profile, such as a reduction in speed, followed by a substantially constant speed at or below the speed limit for the road, potentially followed by an increase in speed. A report may then be sent from the mobile device to a server indicating the location of the vehicle at the time the characteristic speed change is detected. It is also envisaged that position data relating to the position of a vehicle at different times when travelling along a route, and which is received at a server, can be used to infer the presence of a speed limit enforcement device. Typically, such position data is obtained from a plurality of different vehicles. The position data received from multiple mobile devices travelling along the same navigable segment can be processed to infer the position of a speed limit enforcement device, e.g. by identifying changes in vehicle speed characteristic of a speed limit enforcement device. The determined speed limit enforcement device may then be added to the database.

Thus, in embodiments of the invention, the duration time data, or, in embodiments, the data indicative of times at which a dynamic POI was in the first and second states which is used to obtain duration time data for the POI, is based upon one or more of: user reports, third part data, image data, and data indicative of the speed of one or more vehicles in the vicinity of the location of the POI. The data may be based upon any combination of such sources. WO 2013/132031 A1 and WO 2013/132033 A1, the entire content of which is incorporated herein by reference, describe in more detail the way in which user reports, alone, or in combination with other sources, may be used to obtain data indicative of the existence of dynamic POIs, and their states. Data from multiple sources may be combined in a fusion engine of a server, and used to update a database, stored by, or accessible to, a server. The server may be the server that carries out the methods of obtaining a duration function, or may be another server or servers. In embodiments described above in which data indicative of times at which a dynamic POI was in first and second states is obtained from a database, the data indicative of the times may be based upon any of the source or sources of data discussed, and preferably the data indicative of the or each time that the POI is in the first or second state is based at least in part on one or more user reports.

It will be appreciated that data indicative of a time at which a dynamic POI was in a given state is indicative of a time at which the dynamic POI may be considered to have been in the state. This may be based upon one or more sources of data as discussed below. Of course, if the data is erroneous, the dynamic POI may not in fact have been in the relevant state at that time. References to a time at which a dynamic POI was in a given state herein therefore refer to times at which the system considers the POI to have been in the relevant state based upon the source(s) of data available to it.

Whatever the source or sources of data that are used, the present invention determines the one or more duration time(s) based upon historical data. Thus the source or sources are source(s) of historical data. It is envisaged that historical data may be used that relates to the operation of the or each POI over a considerable time period, e.g. weeks, months, or even years. This may enable an accurate duration time function to be derived even where duration data for POIs is relatively sparse, or may provide data allowing variation in duration time with respect to time to be obtained where the periodicity of any repeat in duration time is long e.g. for dynamic POIs relating to seasonal effects.

In accordance with the invention, the duration time data and its associated time data determined in respect of the dynamic POI(s) of the set of one or more dynamic POIs is used to obtain a duration time function indicative of the variation in duration time with respect to time for the set of one or more dynamic POIs. The duration time function may be indicative in any manner of the variation in duration time of the set of one or more dynamic POIs with respect to time. The duration time function is based upon the data indicative of multiple duration times and their associated times determined in respect of the one or more dynamic POIs, whether these relate to a single POI or different POIs. The duration time function preferably relates to duration time in a given state e.g. in a first or active state. The duration time function may be indicative of duration time in an active state after activation.

Obtaining the duration time function involves aggregating the data indicative of multiple duration times obtained relating to the one or more dynamic POIs of the set of one or more dynamic POIs. This aggregation may be performed in any suitable manner. Aggregating the duration times involves combining duration times in respect of different times to provide an overall function indicative of variation in duration time with respect to time based upon the data indicative of the multiple duration times. The resulting function may or may not reflect the distribution in duration times in given time periods. Where multiple duration times are obtained in respect of a given time, whether associated with the same or different POIs, the method may comprise averaging the duration times for that time, e.g. by determining a median or statistical mean of the plurality of duration times for the given time. Of course, there may not necessarily be multiple duration times for a given time where multiple duration times obtained, whether in respect of the same or different POIs of the set, relate to different given times. It will be appreciated that where the duration function is to be obtained in respect of a given period, such as a week, data relating to duration times in respect of corresponding times in different weeks will be considered to relate to the same time, providing multiple duration times for a given time.

The number of individual duration times used in obtaining the duration time function will depend upon various factors. Greater numbers of duration times may be considered whether a larger set of POIs is taken into account, and/or wherein duration time data is obtained in relation to a longer period. A suitable number of duration times may be chosen depending upon various factors, including a level of accuracy required, how fresh the data is desired to be, the number of available applicable duration times etc. It has been found that accurate results may be obtained using relatively small numbers of duration times. It is possible to take into account data relating to the states of POIs relating to past periods in terms of days, weeks, months or even years where appropriate historical data is available.

The duration time function is preferably a single function obtained based upon the data indicative of multiple duration times. The duration time function may be a continuous function. In some embodiments obtaining the duration time function may involve obtaining data indicative of a distribution of the duration times associated with the set of one or more dynamic POIs at different times. For example, a plurality of discrete histograms in respect of different time periods may be obtained, each being indicative of the distribution of duration times associated with the set of one or more dynamic POIs in the given time period. Duration times for a given time period may be assigned to one of a plurality of bins indicative of duration time, each representing a given length of time, e.g. 15 minutes. The data indicative of the distribution of the duration times at different times may then be used to obtain the duration time function. Whether or not a histogram is used, obtaining the duration time function may comprise obtaining a single duration time representative of an average duration time for each of a plurality of different times based on the duration time data, e.g. by obtaining a statistical mean or median of duration times applicable to the time.

The duration time function may be indicative of the variation in duration time of the POIs of the set of one or more POIs with respect to time for a given time period. The given time period may be of any desired length. It has been found that in many cases, the duration time of a dynamic POI exhibits a variation with respect to time that repeats after a certain interval. The given time period may be chosen to correspond to the repeat interval for the duration time of the POIs of the sets of one or more POIs whose duration data is used to obtain the duration time function. The frequency with which the variation repeats will depend upon various factors, e.g. the nature of the POI, etc. However, often the variation exhibits a pattern that repeats on a weekly or working week basis. In some preferred embodiments the given time period is therefore a week or working week. In other embodiments, the given time period may be a day. This might be applicable, for example, for speed limit enforcement POIs, traffic jams or similar. In other embodiments, e.g. where the one or more dynamic POIs of the set are weather or environment related POI, the variation with respect to time may exhibit a pattern that repeats on a seasonal basis, such that a longer period may be considered e.g. 1 year. Thus, the period over which the duration time function extends may be in terms of hours, days, weeks, months, seasons or years. In some embodiments the duration time function may comprise a plurality of function in respect of different time periods. For example, functions may be derived in respect of weekdays, weekends, etc, or even over different lengths of time for the same set of one or more POIs, e.g. per hour of the day, per day of the week, etc.

The duration time function is indicative of the variation of duration time with respect to time. This enables an expected duration time to be obtained for a time of interest. The duration time function may be used to look up the duration time for a given time. The time may be any suitable measure of time, e.g. current time, or a time of initiation of the first or second state. In preferred embodiments in which the first state is an active state and the second state is an inactive state, the duration time function is preferably indicative of the variation of duration time with respect to activation time. The duration time function is preferably dependent only upon time.

As described above, the methods of the present invention may be applied to obtaining a duration time function based upon duration time data relating to a single dynamic POI. This may be appropriate where sufficient duration time data in respect of different times is available for the POI. However, in preferred embodiments the set is a set of a plurality of dynamic POIs.

It has been found that the variation in duration time with respect to time for dynamic POIs which are similar in relation to one or more attributes may be broadly similar. Thus, a duration time function may be derived based on data relating to dynamic POIs that are similar in relation to one or more attributes, which duration time function may then be used to provide an applicable expected duration time for any new POI that is also similar in relation to those attributes. The variation in duration time for a dynamic POI with respect to time is often strongly dependent upon the type of POI. The type of POI may refer to a class of the POI or may be a more specific type. For example, a traffic jam may tend to become active at a particular time during the day, e.g. 1 pm, and last for 2 hours, while black ice may only become active late at night, and last for eight hours. Another factor influencing the variation in duration time for a dynamic POI is the location of the POI.

In preferred embodiments, the or each duration time function that is obtained is specific to dynamic POIs having one or more particular attributes. The duration time function may then be used to provide an expected duration time for a new POI that has the one or more attributes. Preferably the attributes include type and/or location, and most preferably both type and location. Preferably the duration time function that is obtained is specific to dynamic POIs of a particular type and/or location. Obtaining a duration time function that is specific to dynamic POIs having a particular attribute or attributes may be achieved by appropriate selection of the dynamic POIs whose duration time data is used in determining the duration time function.

The present invention involves carrying out the steps of obtaining data indicative of a plurality of duration times, using the duration time data to obtain a duration time function, and associating the duration time function with location data, in respect of one or more set of one or more dynamic POIs. Preferably the or each set of one or more dynamic POIs is a set of one or more dynamic POIs selected by reference to one or more attributes of the dynamic POIs. The attributes preferably include one or both of location and type.

Preferably the or each set of one or more dynamic POIs is a set of one or more dynamic POIs that are considered similar in relation to one or more given attributes, and the duration time function obtained using the duration time data of the or each set of one or more dynamic POIs is specific to dynamic POIs having, or being similar in respect to, the one or more given attributes. Preferably the or each set of one or more dynamic POIs is a set of one or more dynamic POIs having the same or similar type and location attributes, and the duration time function obtained using the duration time data of the or each set of one or more dynamic POIs is specific to dynamic POIs having the same or similar type and location attributes.

Where a set of one or more dynamic POIs consists of a single dynamic POI, the attribute(s) of that dynamic POI may determine the attributes of dynamic POIs to which the determined duration function is applicable. Thus, the dynamic POI may have one or more particular attributes, e.g. location and type, and the determined duration function will be specific to dynamic POIs having the same or similar attributes, e.g. location and type.

In embodiments in which the one or more set of one or more dynamic POIs considered in obtaining a duration time function includes one or more set of a plurality of dynamic POIs, the or each set of dynamic POIs is preferably a set of a plurality of dynamic POIs that are considered to be similar in respect of one or more attributes. The one or more attributes may be chosen as desired, such that the duration times of dynamic POIs that are similar in relation to the one or more attributes may be expected to have similar time dependency. In these preferred embodiments, dynamic POIs are effectively grouped together to provide a greater number of duration times that can be used to derive a duration time function. By considering duration time data for multiple dynamic POIs in obtaining a duration time function, it is possible to obtain a function without requiring large amounts of data in relation to specific dynamic POIs. The attributes preferably include one or both of location and type.

In these embodiments, a set of a plurality of dynamic POIs considered in obtaining the duration time function may be a subset of a plurality of dynamic POIs in a geographical region. The subset is selected by reference to one or more attributes of the POIs in the region. The method may comprise obtaining data indicative of a plurality of dynamic POIs in a geographic region, and, for each dynamic POI, data indicative of at least one time at which the POI was in a first state, and at least one time at which the POI was in a second state, and analysing the data to identify the subset of a plurality of the dynamic POIs based on one or more attributes of the dynamic POIs. The method may comprise identifying a subset of dynamic POIs that are considered to be similar in relation to one or more attributes. Preferably the attributes include one or more preferably both of location and type. The step of obtaining the data indicative of the plurality of dynamic POIs in the geographic region may comprise obtaining the data from a database. The database may be the same database which provide data indicative of duration times as described above, and may be stored by or accessible to a server that determines the duration time data.

In preferred embodiments the method may comprise the step of clustering dynamic POIs in a geographic region to provide the one or more, and preferably a plurality of, sets of a plurality of dynamic POIs that are considered to be similar in respect of one or more attributes. The method may comprise obtaining data indicative of a plurality of dynamic POIs in a geographic region, and, for each dynamic POI, data indicative of at least one time at which the POI was in a first state, and at least one time at which the POI was in a second state, and clustering the dynamic POIs to provide the one or more, and preferably a plurality of, sets of a plurality of dynamic POIs that are considered to be similar in respect of one or more attributes. The attributes preferably include at least one or both of location and type. The clustering is therefore carried out based upon one or more attributes of the dynamic POIs, preferably including at least one or both of location and type. The steps of obtaining duration time data for the dynamic POIs of a set, and obtaining a duration time function using the duration time data, may be carried out for each set of dynamic POIs identified. A clustering operation may be carried out in any suitable manner using techniques known in the art. Obtaining a set of dynamic POI that are similar in terms of location may involve identifying a set of POI based on the location of the individual POIs that are within a given region. The region may be any predetermined region over which it is considered that time dependence of duration time associated with dynamic POI in the region will be relatively flat.

The term "similar" in relation to an attribute as used herein may refer to a dynamic POI having the same or similar value for the attribute. Similarity may be assessed using any suitable test, and will depend upon the particular context. For example, similarity in respect of location may be assessed in terms of distance between the locations in question, etc.

Once a duration time function has been determined, data indicative of the function is associated with data indicative of a geographic location. The geographic location is a geographic location to which the duration time function is applicable. In other words, the location is a location selected such that the duration time function may be considered to be applicable to a new POI associated with the location, e.g. that is within, or at least partially within the location. As described above, a duration time function may additionally be specific to dynamic POIs having one or more other attributes, e.g. type, and thus the duration time function is not necessarily applicable to every new POI associated with the given location. However, it will be applicable to at least a subset of such dynamic POIs.

The location may be any type of location. The location could be a point location, e.g. a set of coordinates. However, preferably the location is a region. The region may be any predetermined area. The shape of the region will depend upon the particular application, e.g. the nature of the POI involved, and their locations, etc. The region may be defined by a shape, such as a polygon, circle, etc. The location is preferably determined based upon the individual location or locations of the or each dynamic POI of the set of one or more dynamic POI considered in obtaining the duration time function. Preferably the location associated with the duration time function is a region including the location or locations of the or each individual POI of the set used in obtaining the duration time function. In preferred embodiments in which the set is a set of a plurality of dynamic POI that are selected by reference to one or more attributes including location, e.g. which are considered to be similar in relation to one or more attributes including location, the location associated with the duration time function may correspond to a location used to obtain the set of dynamic POIs, e.g. through a clustering operation. The location may be a region that was defined to enable dynamic POIs having a similar location to be identified, i.e. those dynamic POIs located within the location. The location associated with the duration time function may extend beyond the locations of individual POIs used in obtaining the duration time function. It is envisaged that relatively few individual dynamic POIs may be considered in obtaining a duration time function that may be applicable to new POIs in a larger region, including the locations of the individual POIs. The extent of the region may be selected as appropriate depending upon, e.g. the type of POI involved.

It will be appreciated that each POI will have an associated location. The location of an individual POI is distinct from the location associated with a duration function, and is typically different thereto. The location associated with a duration function is typically a region that is of greater area than a location associated with a given POI upon which the location is based. The definition of the location of an individual POI will depend upon the nature of the POI. The location may be a point location, or may be a region. The region may be any predetermined area. The shape will typically depend upon the nature of the POI. For example, the location of a dynamic POI that is a speed limit enforcement device may be a road stretch including the device. A road stretch is defined by one or more connected road segments. If the POI is a larger scale effect, such as black ice or morning thaw, the location of the POI may be defined by a shape, such as a polygon or circle. The location of individual dynamic POIs may be used in various manners in the invention as described below, e.g. in obtaining a set of a plurality of dynamic POIs in respect of which a duration time function is obtained, and/or determining the location associated with a determined duration time function.

The method preferably further comprises storing data indicative of the duration time function and the associated data indicative of the given geographic location. The data may be stored in any suitable database. The database may be stored on a server or accessible by a server. The data indicative of a duration time function may additionally be associated with data indicative of one or more attribute other than location, the attribute or attributes being indicative of attribute(s) of dynamic POI to which it is applicable. The attribute may include a type of the POI.

Data indicative of the duration time function may be associated with data indicative of the given geographic location in any suitable manner. The data may be stored in any manner which provides a relationship between the duration time function and the geographic location. In some embodiments the method comprises storing data indicative of the location, and storing data indicative of the duration time function associated therewith as an attribute of the location. By associating the duration time function with data indicative of the location to which it is applicable in this way, it is possible to avoid incorporating location dependence in the duration time function itself. This may allow the data to be more readily stored, by merely associating data indicative of the function with data indicative of the location, e.g. region. Data indicative of the duration time function and the geographic location may be stored in relation to an applicable electronic map. In some embodiments the duration time function is dependent only upon time.

The data indicative of the duration time function may be in any way indicative of the function. A determined duration time function may undergo any appropriate processing to provide the duration time function data that may be stored. The data indicative of the duration time function is data that will enable the duration time function to be determined. In some cases this may require a process of reconstructing the duration time function. In some embodiments the method may comprise discretizing an obtained continuous duration time function to provide the data indicative of the duration time function that is preferably stored. This may be achieved by sampling the function at a plurality of equidistant sample points, as known in the art.

Alternatively or additionally the method may comprise compressing the duration time function to provide the data indicative of the duration time function that is preferably stored. It will be appreciated that where multiple duration time functions are derived, e.g. in respect of different types of POI and/or locations, these may exhibit some similarities. It is envisaged that the duration time functions may then be used to determine certain common components which may be used to build up an approximation of each duration time function. The data indicative of a duration time function may therefore be indicative of an approximation of the duration time function, which may be expressed by reference to one or more standard components. The components may be in the form of vectors. In some preferred embodiments the method may comprise determining an approximation of the duration time function by expressing the function (preferably subsequent to discretization) as vectors. The method may further comprise obtaining an orthogonal basis in the vector space thus defined. The basis of the orthogonal vectors may be generated using a principal component analysis (PCA). In embodiments the method may therefore comprise compressing the duration time function by approximating the duration time function by a basis of orthogonal vectors, preferably wherein the basis of the orthogonal vectors is generated using a principal component analysis (PCA).

While the above discussion has specifically mentioned consideration of attributes of dynamic POIs that are a location and/or type of the POI, any other desired attribute or attributes may alternatively or additionally be taken into account. For example, another attribute that may be considered is the class of road associated with a POI, e.g. functional road class. Any additional attribute may be used to select a set of one or more dynamic POIs for which a duration time function is to be derived.

It will be appreciated that a numerous duration time functions may be determined using duration time data relating to given sets of one or more POIs. The duration time functions are applicable to particular locations, defined by the location data associated therewith. The duration time functions may also be specific to dynamic POIs having one or more particular attributes, or attributes similar thereto, e.g. type, etc.

The present invention also extends to methods of using the duration time function data associated with location data, which may be obtained in accordance with any of the earlier described aspects and embodiments of the invention. These steps may be carried out by a server, which may be the same or different to a server that obtained the duration time function data. The method may comprise using the determined duration time function data and its associated location data to obtain data indicative of a duration time for a dynamic POI for a time of interest. The duration time may be a time that the dynamic POI is to remain in a first state before changing to a second state following initiation of the first state. The method may comprise identifying that the duration time function is applicable to the POI based upon a location of the POI, and using the duration time function to identify a duration time for the dynamic POI for a time of interest. In preferred embodiments in which a plurality of duration time functions and associated locations are determined, the method may comprise identifying an applicable duration time function from the database based upon one or more attributes of the dynamic POI including location, and using the duration time function to identify a duration time for the dynamic POI for a time of interest. In these embodiments the duration time function and its associated location data is preferably stored in a database. The duration time function is therefore obtained from the database.

In accordance with a third aspect of the invention there is provided a method of obtaining data indicative of a duration time for a dynamic POI, the duration time being a time that the dynamic POI remains in a first state before changing to a second state following initiation of the first state, the method comprising:

obtaining data identifying a geographic location of the dynamic POI;

accessing a database storing data indicative of a plurality of duration time functions, each duration time function being associated with data indicative of a geographic location, and each duration time function being indicative of a variation in duration time with respect to time; and obtaining the data indicative of the duration time for the dynamic POI by identifying an applicable duration time function from the database based upon at least the geographic location of the POI, and using the identified duration time function to determine a duration time for the dynamic POI for a time of interest.

The present invention in these further aspects may include any or all of the features described in relation to the first or second aspect of the invention, and vice versa, to the extent that they are not mutually inconsistent.

In accordance with a fourth aspect of the invention there is provided a system, optionally a server, for obtaining data indicative of a duration time for a dynamic POI, the duration time being a time that the dynamic POI remains in a first state before changing to a second state following initiation of the first state, the system comprising:

means for obtaining data identifying a geographic location of the dynamic POI;

means for accessing a database storing data indicative of a plurality of duration time functions, each duration time function being associated with data indicative of a geographic location, and each duration time function being indicative of a variation in duration time with respect to time; and means for obtaining the data indicative of the duration time for the dynamic POI by identifying an applicable duration time function from the database based upon at least the geographic location of the POI, and using the identified duration time function to determine a duration time for the dynamic POI for a time of interest.

The present invention in this further aspect may include any or all of the features described in relation to the third aspect of the invention, and vice versa, to the extent that they are not mutually inconsistent. Thus, if not explicitly stated herein, the system of the present invention may comprise means for carrying out any of the steps of the method described.

The method in these further aspects and embodiments of the invention is preferably carried out by a server. Preferably the system is therefore a server. The server may be a server that is arranged to generate dynamic POI data, or may be a different server. The means for carrying out any of the steps of the method may comprise a set of one or more processors configured, e.g. programmed, for doing so. A given step may be carried out using the same or a different set of processors to any other step. Any given step may be carried out using a combination of sets of processors. The means for carrying out a particular step may be a processing resource of a server. However, it is envisaged that use of the duration time function data may alternatively be carried out by a mobile device or similar, with appropriate access to a database storing such data.

The data of the database indicative of a plurality of duration time functions, each being associated with data indicative of a geographic location, may be obtained in accordance with any of the embodiments of the first and second aspects of the invention earlier described. The duration time functions may be obtained based upon duration time data relating to different sets of one or more dynamic POIs as earlier described.

In accordance with these further aspect and embodiments of the invention the duration function data is used to obtain a duration time for a dynamic POI. The duration time is a time that the dynamic POI remains (i.e. is to remain) in a first state before changing to a second state following initiation of the first state. The first state is preferably an active state of the POI, and the second state an inactive state as described earlier. In preferred embodiments therefore the first state is an active state of the dynamic POI and the second state is an inactive state of the POI, the duration time being a time that the dynamic POI is to remain active before becoming inactive after activation.

The time of interest in respect of which a duration time is obtained from the data indicative of the identified duration time function may be any applicable time. The time may be a current time, or a time at which the first state of the dynamic POI is to be initiated, e.g. a time of planned activation. Where the POI is a newly created dynamic POI, the time may be a time of creation of the POI. Preferably the time is a time of planned activation.

The dynamic POI may be any POI for which duration data is required. Preferably the dynamic POI is a newly created POI. The step may be carried out as part of the process of creating the dynamic POI. The method may further comprise creating data indicative of the dynamic POI, the data comprising the data indicative of the duration time of the POI, and data indicative of at least a type and location of the POI.

The step of creating data indicative of the new dynamic POI is carried out after receiving data indicative of the existence of the dynamic POI. Data indicative of the existence of a dynamic POI may be indicative merely of the presence of the POI, or may comprise data relating to the operation or attributes of the POI. The data indicative of the existence of the dynamic POI may be based on one or more reports, and preferably user reports. However the data may be based on any source or sources. The source or sources may be any of the source or sources described above as providing data indicative of times that a POI was in first and second states. Thus, in embodiments of the invention, data indicative of the existence of the dynamic POI may be based upon one or more of: user reports, third party data, image data, or data indicative of the speed of one or more vehicles in the vicinity of the location of the POI. The data may be based upon any combination of such sources. Creation of a new POI, and hence creation of the data indicative thereof, may be carried out automatically upon receipt of a data indicative of the existence of the POI, optionally subject to verification of the data. Verification may be carried out in any of the manners previously described, e.g. requiring corroborative data, by consideration of the trust worthiness of a source, etc.

Of course, the duration data need not be obtained in relation to a newly created POI. The duration data may be obtained in relation to a planned change in state of an existing POI, e.g. a reactivation of an inactive POI.

The method involves identifying data indicative of an applicable duration time function from the database based upon one or more attributes of the dynamic POI. The method comprises using the location of the dynamic POI to identify data indicative of a duration time function from the database that is associated with a geographic location applicable to the location of the dynamic POI. Preferably the identified duration time function is a function associated with a geographic location that is a region including the location of the new POI, or at least a portion thereof. For example, where the POI is associated with a location in the form of a predetermined area, rather than a point location, a duration time function may be selected which is associated with a location which at least overlaps the location of the POI. The location of the POI may be located fully within the location associated with the duration time function. In embodiments in which the data indicative of the duration time function is associated with data indicative of the geographic location as an attribute thereof, the method may comprise identifying an applicable geographic region, and identifying the duration time function that is an attribute thereof.

As well as location, other attributes may be taken into account when determining data indicative of an appropriate duration time function from the database for use in obtaining a duration time for a given POI. Preferably the method comprises identifying data indicative of a duration time function from the database for use in obtaining the duration time for the POI based additionally on one or more attributes of the POI in addition to location, e.g. type, road class, etc. Preferably the one or more attributes includes at least a type of the POI. In some embodiments the database stores data indicative duration time functions specific to dynamic POIs having one or more particular attributes, each duration time function being associated with data indicative of a given geographic location, wherein the attributes include at least a type of the dynamic POI, and the step of obtaining the data indicative of the duration time for the dynamic POI comprises using data indicative of the type of the dynamic POI to identify a duration time function that is in respect of dynamic POIs of the same or similar type as the dynamic POI, and which is associated with data indicative of a geographic location applicable to the location of the dynamic POI. The identified duration time function may then be used to obtain the duration time for the POI. Of course any other attribute may alternatively or additionally be used.

The step of obtaining data indicative of a duration time for a time of interest using the data indicative of the duration time function involves determining the duration time in respect of the time of interest according to the identified duration time function. This may simply involve looking up the applicable duration time. The data indicative of a duration time function obtained from the database may be directly or indirectly indicative of the duration time function. It may be necessary to carry out one or more processing steps using the data to obtain a duration time function that can be used to identify the duration time. For example, the duration time function may need to be reconstructed, e.g. if it has been compressed.

The present invention also extends to a database of data indicative of one or more duration time functions associated with location data obtained using any of the above described methods of the present invention.

Once the data indicative of a duration time for the dynamic POI has been obtained, it may be used in various manners. The method preferably comprises associating the data indicative of the duration time for the POI with data indicative of the POI. The method may further comprise transmitting the obtained data indicative of a duration time for the dynamic POI to one or more remote device. This step may be carried out by a server. The or each remote device may be a mobile device. Preferably the duration data is transmitted together with data indicative of at least a location and type of the POI. The data may be transmitted to any remote device to which the information is applicable. For example, the data may be transmitted to one or more remote device in proximity to the dynamic POI, e.g. within a predetermined area based on a location of the POI. In other embodiments the data may be transmitted to provide a general update for use by remote devices, e.g. in updating electronic map data. The data may instead be transmitted to a server, which could use the data in updating an electronic map, or providing to one or more remote device at a subsequent time. The data may be transmitted together with any additional data relating to the dynamic POI. For example, where the POI is a speed limit enforcement device, data indicative of the relevant speed limit, nature of the speed limit enforcement device, etc may be transmitted.

In some embodiments, the present invention further extends to the use of the indicative of a duration time of a dynamic POI on a computing device, such as a remote computing device, and optionally a remote mobile computing device.

In some embodiments, a visual representation of the dynamic POI can be provided on a display device of the computing device based on the obtained data indicative of the duration time of the dynamic POI, e.g. an absolute time or a time relative to the current time, i.e. a countdown. For example, the visual representation of the dynamic POI can be provided when the POI is in the first state, but not in the second state. Alternatively, the visual representation of the dynamic POI can be provided when the POI is in the second state, but not in the first state.

Additionally, or alternatively, a warning in respect of the dynamic POI can be provided to a user based on the obtained data indicative of the duration time of the dynamic POI. The warning can, for example, be provided visually, audibly and/or haptically using suitable means of the computing device such as a display, speaker, vibrator, etc. As will be appreciated, the warning can be provided when the POI is in the first state, but not in the second state. Alternatively, the warning can be provided when the POI is in the second state, but not in the first state. The warning may be provided to the user when the user is approaching the POI, e.g. when in a predetermined distance or expected travel time of the POI, and when the POI is in the appropriate state. The POI in such embodiments can be a speed limit enforcement device, such as a speed camera, or an event, such as roadworks, an accident, weather, etc.

Additionally, or alternatively, the dynamic POI can be used in a navigation and/or routing operation by a computing device. For example, dependent on the current or future state of the POI, e.g. the state of the POI at the time at which the POI is expected to be reached, and which is based on the obtained data indicative of the duration time of the dynamic POI, then, for example, a route can be planned via the POI or a route can be planned avoiding the POI.

As will be appreciated, in some embodiments a server system of the present invention may communicate with one or more remote devices to provide duration function data or to obtain data indicative of relating to a dynamic POI, e.g. a user report. The remote devices, i.e. devices that are spatially remote from the server system, can be of any suitable form. For example, the information from the server system may be sent to fixed location devices, e.g. home computers and the like. In a preferred embodiment, however, the remote devices are mobile devices that are preferably of a form where they can be carried or transported in a vehicle. The mobile devices may be portable devices, e.g. capable of being handheld, and which, for example, may be removably mounted within a vehicle. Alternatively, or additionally, the mobile devices may be in-vehicle systems, i.e. devices that are permanently mounted within vehicles.

As will be appreciated, the mobile devices are preferably capable of determining the current position of the device, and thus preferably comprise location determining means. The location determining means could be of any type. For example, a mobile device could comprise means for accessing and receiving information from WiFi access points or cellular communication networks, and using this information to determine its location. In preferred embodiments, however, a mobile device comprises a global navigation satellite systems (GNSS) receiver, such as a GPS receiver, for receiving satellite signals indicating the position of the receiver at a particular point in time, and which preferably receives updated position information at regular intervals.

The mobile devices may also include means for determining the relative displacement of the vehicle in which the device is carried, thereby allowing, for example, the speed and driving direction of the vehicle at any point in time to be determined. The means could comprise one or more electronic gyroscopes or accelerometers in the device, or the device could have access to such sensors in the vehicle itself, e.g. using the vehicle CAN bus.

Accordingly, in preferred embodiments, the mobile devices that are utilised in the present invention comprise navigation apparatus, such as portable navigation devices (PNDs) that can be removably mounted within a vehicle or in-vehicle navigation systems, and which preferably include GNSS signal reception and processing functionality. It will be appreciated, however, that the mobile devices may also comprise mobile telephones, PDAs, tablet computers or the like running suitable software programs.

The mobile devices also comprise communication means for transmitting and receiving information from the system, e.g. server, of the present invention. The information may comprise reports indicating new dynamic POIs, e.g. speed limit enforcement devices or errors associated with dynamic POIs e.g. speed limit enforcement devices already in the database. The communication means could be of any type. For example, the devices may comprise one or more physical connector interfaces by means of which power and/or data signals can be transmitted to and received from the device. In preferred embodiments, however, the communication means comprises one or more wireless transmitters/receivers to allow communication over cellular telecommunications and other signal and data networks, for example WiFI, Wi-Max, GSM and the like.

In embodiments of the present invention, reports are received from mobile devices containing information indicating the presence and/or state of a new dynamic POI. These reports will typically be generated in response to a user input, e.g. by the user inputting information on a mobile device indicating a new speed limit enforcement device or an error in an already exiting device. It is also envisaged, however, that reports could be automatically generated, partially or fully, by the mobile device.

Any of the methods in accordance with the present invention may be implemented at least partially using software, e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

Like reference numerals are used for the like features throughout the drawings.

DETAILED DESCRIPTION OF THE PREFERRED EMBODIMENTS

Embodiments provide a method and system for processing data relating to dynamic points of interest, POIs, such as speed enforcement devices. The methods and systems involve the use of a database storing data relating to dynamic POIs. The database is based, at least in part, upon information in the form of reports received, for example, from a plurality of mobile devices 200. The reports are used to continually supply information on new POIs not already in the database, and to improve the accuracy of information on POIs already in the database.

The invention will be described in the following passages in relation to dynamic POIs in the form of speed limit enforcement devices. It will be appreciated, however, that the methods of the invention are equally applicable to any type of dynamic point of interest, and are not limited only to speed limit enforcement devices. Accordingly, in the following, the term "speed limit enforcement device" can be replaced by the term "dynamic point of interest", unless the context requires otherwise.

The mobile devices 200 can be of any suitable form, but in illustrative embodiments are navigation apparatus, such as portable navigation devices (PNDs). Preferred embodiments of the present invention will now be described with particular reference to a PND. It should be remembered, however, that the teachings of the present invention are not limited to PNDs but are instead universally applicable to any type of processing device that is configured to alert drivers when they are approaching a POI using a local and/or remote database listing such POIs. It follows therefore that in the context of the present invention, the mobile devices 200 could be a PND, a navigation device built into a vehicle, or indeed a computing resource (such as a desktop, portable personal computer (PC), tablet computer, mobile telephone or portable digital assistant (PDA)).

Figure 1:
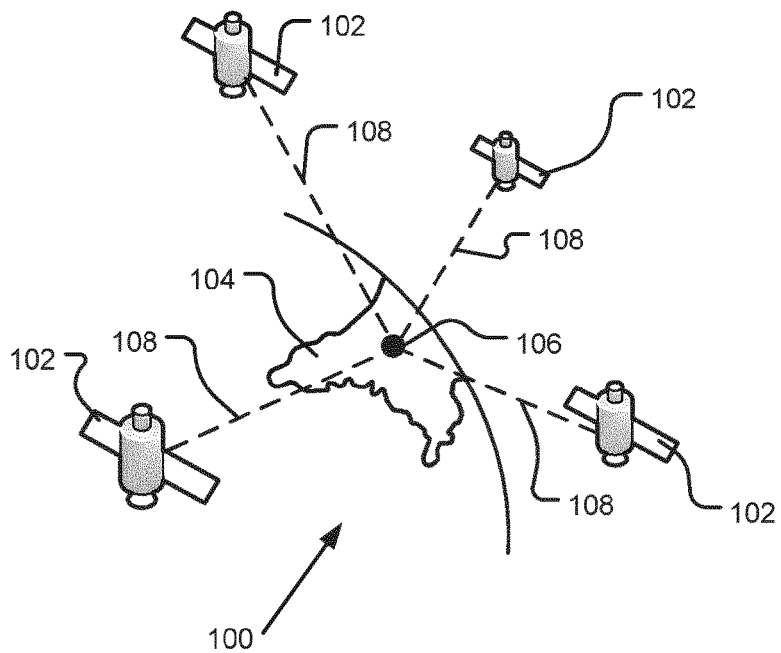
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 102 are in orbit about the earth 104. The orbit of each satellite 102 is not necessarily synchronous with the orbits of other satellites 102 and, in fact, is likely asynchronous. A GPS receiver 106 is shown receiving spread spectrum GPS satellite signals 108 from the various satellites 102.

The spread spectrum signals 108, continuously transmitted from each satellite 102, utilize a highly accurate frequency standard accomplished with an extremely accurate atomic clock. Each satellite 102, as part of its data signal transmission 108, transmits a data stream indicative of that particular satellite 102. It is appreciated by those skilled in the relevant art that the GPS receiver device 106 generally acquires spread spectrum GPS satellite signals 108 from at least three satellites 102 for the GPS receiver device 106 to calculate its two-dimensional position by triangulation. Acquisition of an additional signal, resulting in signals 108 from a total of four satellites 102, permits the GPS receiver device 106 to calculate its three-dimensional position in a known manner.

Figure 2:
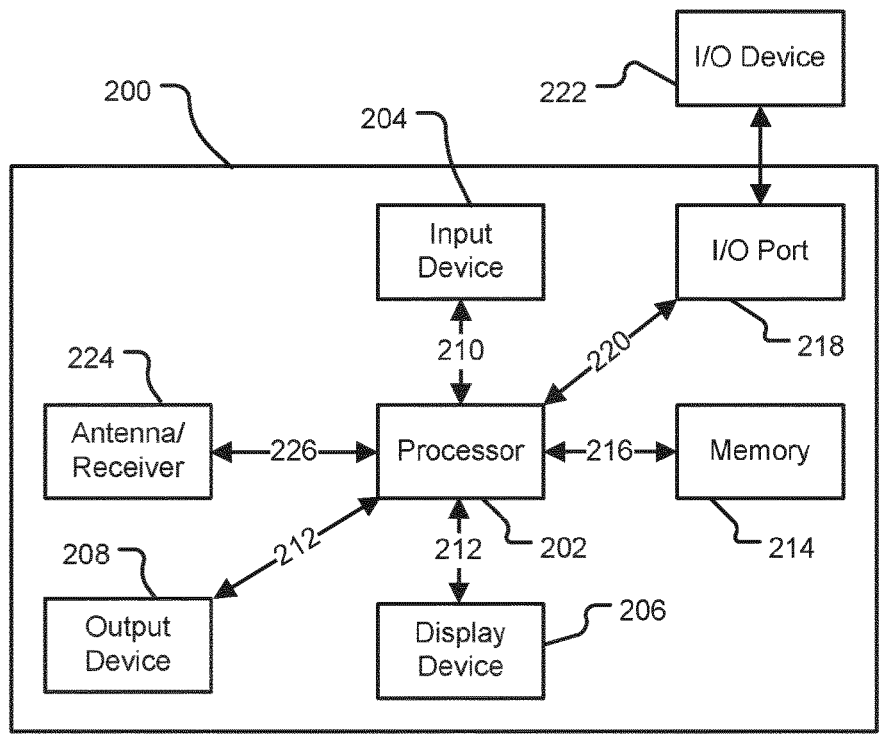
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 202 connected to an input device 204 and a display screen 206. The input device 204 can include a keyboard device, voice input device, touch panel and/or any other known input device utilised to input information; and the display screen 206 can include any type of display screen such as an LCD display, for example. In a particularly preferred arrangement the input device 204 and display screen 206 are integrated into an integrated input and display device, including a touchpad or touchscreen input so that a user need only touch a portion of the display screen 206 to select one of a plurality of display choices or to activate one of a plurality of virtual buttons.

The navigation device 200 may include an output device 208, for example an audible output device (e.g. a loudspeaker). As output device 208 can produce audible information for a user of the navigation device 200, it is should equally be understood that input device 204 can include a microphone and software for receiving input voice commands as well.

In the navigation device 200, processor 202 is operatively connected to and set to receive input information from input device 204 via a connection 210, and operatively connected to at least one of display screen 206 and output device 208, via output connections 212, to output information thereto. Further, the processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation device 200. The memory resource 214 comprises, for example, a volatile memory, such as a Random Access Memory (RAM) and a non-volatile memory, for example a digital memory, such as a flash memory. The external I/O device 222 may include, but is not limited to an external listening device such as an earpiece for example. The connection to I/O device 222 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server 302 via the internet or some other network for example.

FIG. 2 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

Figure 4:
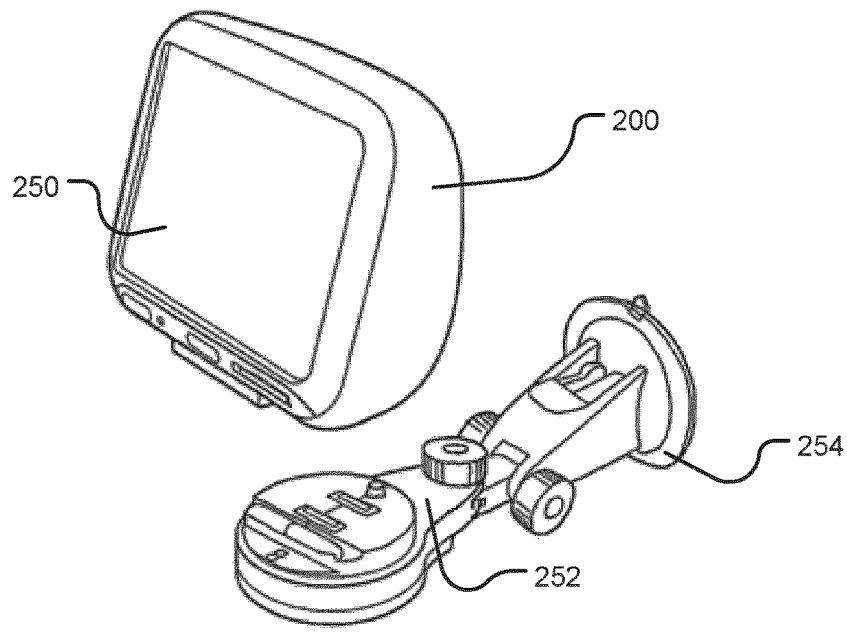
FIG. 4 is a perspective view of a navigation device.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. As an example, FIG. 4 shows a navigation device 200 that may sit on an arm 252, which itself may be secured to a vehicle dashboard, window, etc using a suction cup 254. This arm 252 is one example of a docking station to which the navigation device 200 can be docked. The navigation device 200 can be docked or otherwise connected to the arm 252 of the docking station by snap connecting the navigation device to the arm, for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 3:
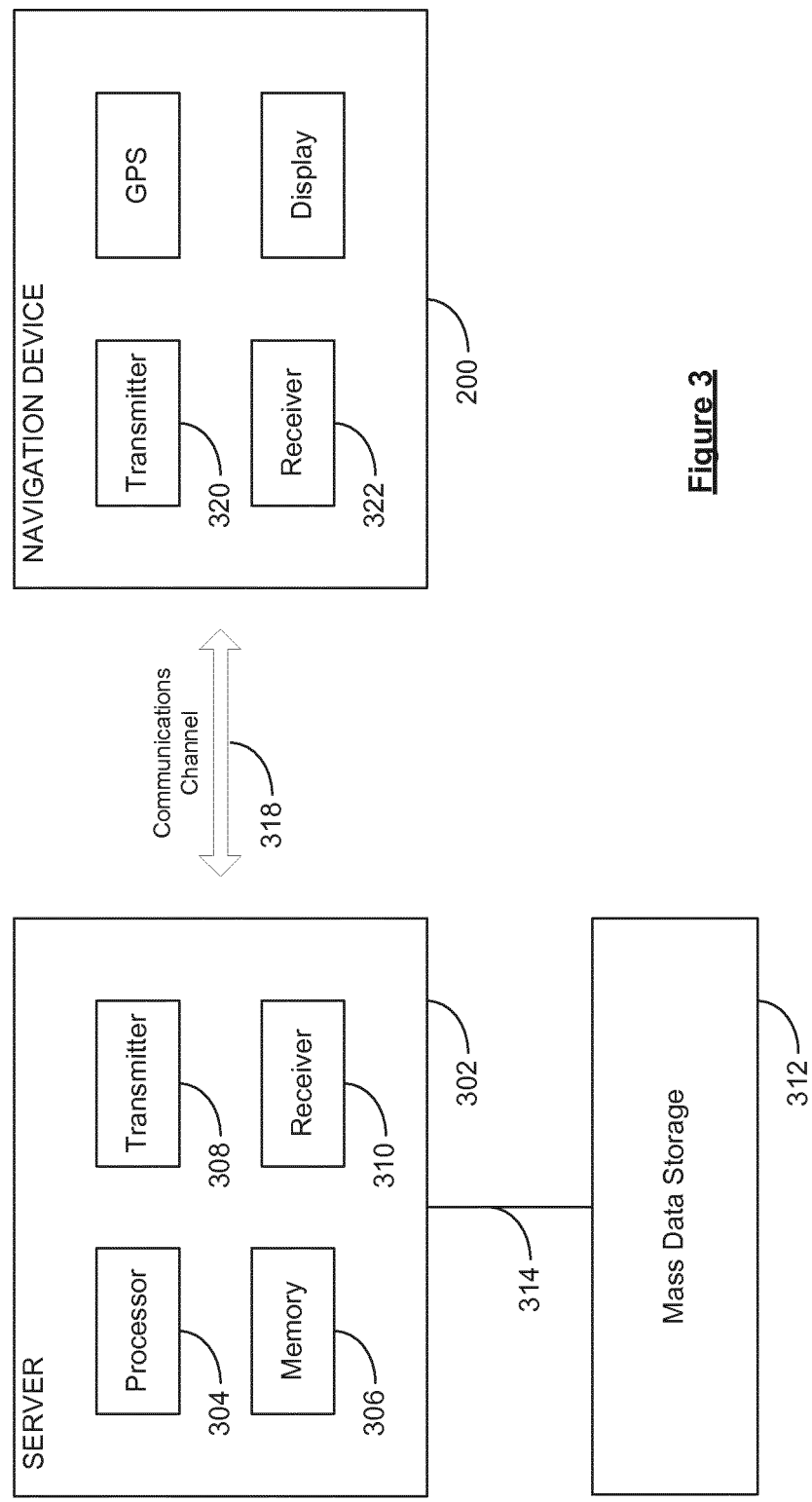
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices 200 provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc; model/manufacturer specific settings may be stored on the navigation device 200, for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc. In other embodiments, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As is known in the art, the navigation device 200 may be configured to provide warnings when a vehicle is approaching a speed enforcement device, such as a mobile or fixed speed camera. In particular, the warning may be provided when the vehicle is approaching the speed enforcement device at a speed that is above the legal speed limit for the road. The warnings may comprise a visual warning on the display 206 of the navigation device 200, an audible warning, a haptic warning, or any combination thereof as desired. In order to provide such warnings, the navigation device has access to a database of speed enforcement devices, which includes at least the location of speed enforcement device and a speed limit for the device. The database will typically be stored on the navigation device 200, e.g. in the memory 214, and will be regularly updated with new data from the server 302 using the communication channel 318. It is envisaged, however, that the navigation device 200 may only temporary store portions of the database for speed limit devices in their immediate vicinity or a planned route.

Due to the nature of speed cameras, e.g. new fixed speed cameras are continually being installed, fixed speed cameras may be moved to a new location, mobile speed cameras will often be in operation for short periods of time, etc, the information in the database on the server 302 needs to be constantly refreshed to ensure that it is accurate and up to date. An exemplary system for maintaining a database of speed enforcement devices is shown in FIG. 5.

Figure 5:
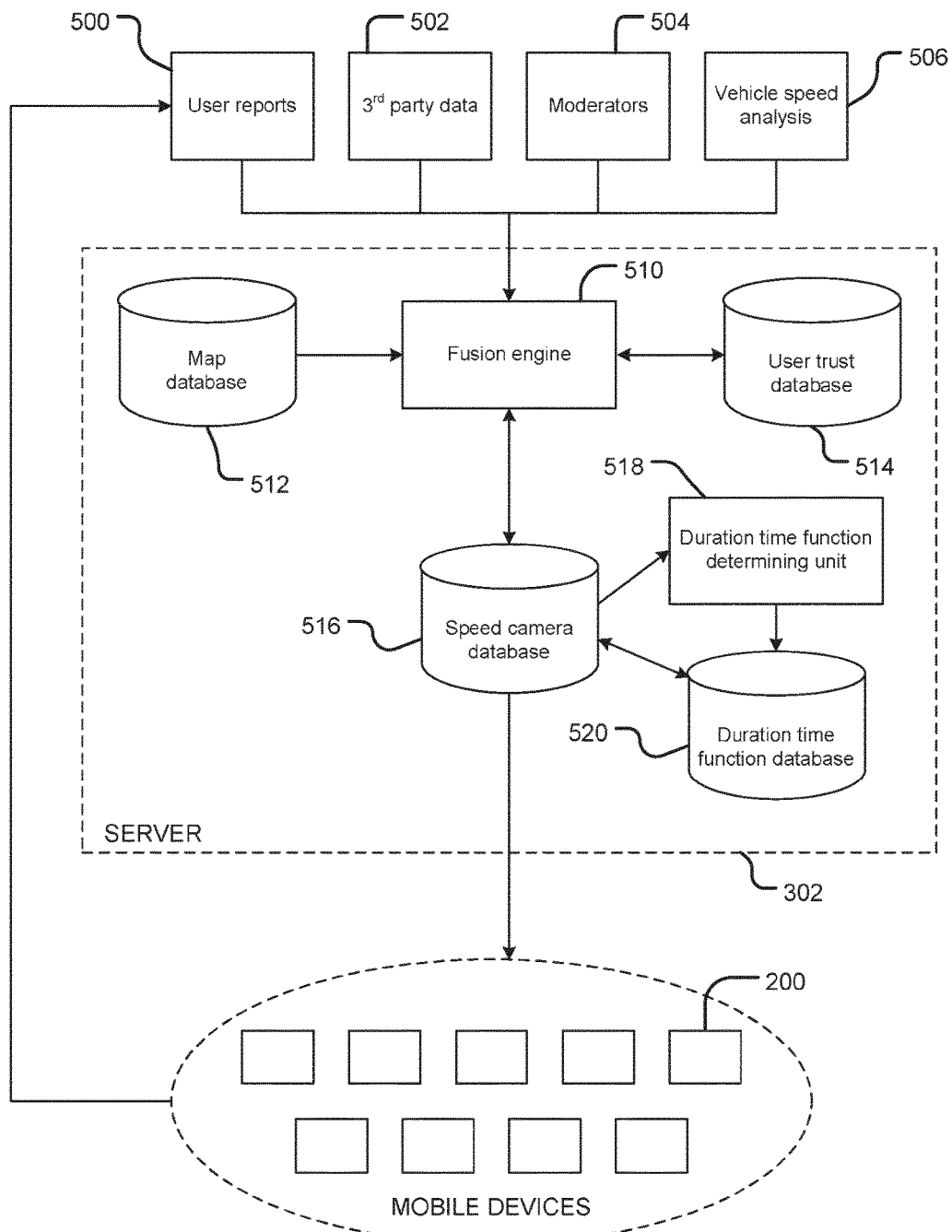
FIG. 5 shows the architecture of a system according to an embodiment of the invention.

As shown in FIG. 5, new speed cameras can be identified, and subsequently added to the speed camera database 516, in a number of ways.

For example, the existence of a speed camera may be determined following the receipt of a report from a user 500. The user reports may be generated in any manner on the navigation devices 200 as appropriate. For example, the navigation device may have a hard button or soft key (on a touch screen display) that can be pressed to automatically generate and transmit a report to the server 302. Such a report may include the location, speed and/or direction of travel of the navigation device (and thus the vehicle) at the time the button is pressed. Additional or more accurate information about a speed camera may subsequently be added to a report by the user before it is transmitted to the server 302. For example, the user may provide the actual speed limit for the road and may also adjust the location of the speed camera as appropriate (e.g. as the location of the device provided in the report will not always reflect the actual position of the speed camera, but will typically be a short distance before or after the actual position of the camera).

Speed camera data can also be obtained from various third parties 502, such as government data, other companies newspapers and other journalistic sources, etc. The existence of speed cameras can additionally be determined from sources, such as images collected by mobile mapping vehicles, and confirmed by moderators 504. It is also envisaged that location of speed cameras can be inferred from changes in the speed of individual vehicles or collections of vehicles 506.

New speed cameras, or modifications to attributes of existing speed cameras, obtained from one or more of the sources 500, 502, 504 and 506 are received at a fusion engine 510 of the server 302. It will be understood by those skilled in the art, however, that speed camera information may be obtained from other sources, in addition to those described above. At the fusion engine 510, the received speed camera information may be combined with one or more of: (i) information already existing in a speed camera database 516; (ii) information from a map database 512, e.g. to identify the location of a speed camera; and (iii) information from a user trust database 514, e.g. to provide an indication as to accuracy of reports previously received from a particular user. The information from all these sources is combined by the fusion engine 510 to produce new or amended speed cameras entries in the speed camera database 516.

Each speed camera in the database is either in an active state or an inactive state. An active state indicates that the system considers that the device considers to exist or be operational in reality; it will of course be understood that the active state of the device in the system is not a guarantee that the device exists or is operational in reality, merely that the information received from the system (and combined within the fusion engine) indicates that warnings or alerts should still be provided a driver in relation to the device in question. Conversely, an inactive state indicates that the system considers the device to no longer exist or be operational in reality. The time between a speed camera being in an active state and an inactive state in the system is referred to herein as its duration time.

In conventional systems, a speed camera will have a duration time assigned to it by the system, e.g. based on its location and type. For example, mobile speed cameras will typically have a much lower duration time than fixed speed cameras. Similarly, mobile speed cameras in urban centres or that are positioned on major roads will typically have a lower duration time than mobile speed cameras in rural areas or that are positioned on minor roads.

In systems that use active community feedback, the duration time for a speed camera will typically be dynamically changed, e.g. by the fusion engine 510, based on received reports. The reports will typically be received from users traversing the road network, i.e. so-called "user reports", but reports indicating the current active or inactive status of a speed camera can also be obtained from other sources, such as journalistic data and third party data. For example, if a particular speed camera is assigned a duration time of 3 hours from the time it is made active, and no reports in relation to the status of the camera are received by the system, then the speed camera will become inactive after 3 hours. However, if one or more reports are received confirming the presence of the speed camera are received by the system, and particularly if received near to the expiration of 3 hours, then the system will typically extend the duration time by an appropriate amount, such that the speed camera may become inactive after 4 hours. Similarly, if one or more reports are received confirming that the speed camera is no longer present or operational, then the system can shorten the duration time accordingly. For example, if one or more such reports are received only an hour after the speed camera has become active in the system, then the speed camera may become inactive in much less than 3 hours.

It has also been recognised, however, that the duration time assigned to a dynamic POI can vary based on a number of factors, such as: the time at which the POI become active in the system, also referred to herein as the "activation time", e.g. the time of day, the day of the week, month, year, etc; and the geographic location of the POI. For example, a mobile speed check may be active for two hours at a location on a Monday morning from 9:00 a.m. after which it is no longer present and is therefore inactive. Another speed check at the same location on the following day may become active at 5:00 p.m. and remain active for three hours. A dynamic POI at a particular location may therefore have different durations, depending on its activation time.

Different types of dynamic POI may also have very different relationships between their duration times and their active times. For example, a traffic jam may only become active at 1:00 p.m. and last for two hours, whereas black ice may only become active late at night and last for eight hours.

Dynamic POIs may also be periodic. For example, the characteristics of POIs such as speed enforcement devices and traffic jams can be expected to be the same for each working day of the week. The duration times for such POIs are therefore periodic, with a period of one day, and repeat for each working day of the week. Other POIs, such as black ice, may be seasonal and have a period of a year.

Embodiments of the invention provide a technique for improving the accuracy of the duration time to be assigned to a dynamic POI as a function of its activation time and its geographic location, so as to allow more accurate alerts and warnings. In particular, in embodiments, a function is derived for a type and location of POI that indicates how duration time varies with time.

As shown in FIG. 5, server 302 further comprises a duration time function determination unit 518. The unit 518 is in communication at least with the database 516, and uses information obtained from the database 516.

One exemplary method for obtaining a duration time function will now be described by reference to FIG. 6.

The speed camera database comprises data indicative of times at which each of a plurality of different speed cameras in a geographic region were found to be active or inactive. This data may have been derived by the fusion engine 510 and incorporated in the database 516 based upon user reports 500 or any of the other sources of data 502-506.

In step 10 at least some of the speed cameras included in the database, and for which active and inactive time data is available, are clustered into sets of speed cameras that are considered similar, at least by reference to location. Any suitable method of obtaining clusters of speed cameras with similar location may be used. This may be done by defining a plurality of predetermined geographic regions, within each of which regions variation in duration with respect to time of speed cameras is expected to be similar. The location of a speed camera may be a point location corresponding to the position of the speed camera, or may be a region corresponding to a stretch of road under surveillance by the speed camera. The latter arrangement may be particularly appropriate for average speed type cameras. Speed cameras may be added to applicable ones of the sets by comparison of a location of the speed camera with the geographic regions utilised for clustering. A speed camera may be added to the set associated with a region that includes the location of the speed camera. Of course, other methods of clustering based upon location may be used, which may not involve defining predetermined geographic regions. Clustering may also take into account one or more additional attributes of the speed cameras, e.g. class of road associated with the camera, type of camera, e.g. mobile, fixed, etc, to provide sets of speed cameras that are similar in relation to the one or more additional attributes as well as in relation to location. Any attribute may be taken into account to result in sets of speed cameras which can be expected to have similar dependence of duration time with respect to time.

The following steps are then carried out for each set of speed cameras obtained, to obtain a duration time function in respect of the set. The steps will be described by reference to one particular set of a plurality of similar speed cameras.

The data of the speed camera database is analysed to obtain, for each speed camera, data indicative of at least one time at which the speed camera was active, and at least one time at which the speed camera was inactive—step 20. Data indicative of a duration time is then obtained for each speed camera, being representative of a difference between a time at which the camera was inactive, and a time at which the camera was active—step 25. For example, where the times at which the camera was inactive and active are based upon user reports, the duration time $t_d$ may be defined by $t_d = t_r - t_a$, t where $t_r$ is a time at which a user deleted the camera, and $t_a$ is a time at which a user reported the camera. It will be appreciated that this may be an approximation of the actual duration time of the camera, i.e. the time spent in the active state, as the reports that a camera was respectively active and inactive may not relate to the precise times of activation and deactivation. Data indicative of more than one duration time for a given camera may be obtained where sufficient data is available. The data indicative of each duration time is in respect of a given time. For example, this may be taken to be the active time. In this way, data indicative of multiple duration times is obtained, each being in respect of a given time. These relate to different speed cameras of the set, and additionally, there may be multiple duration times obtained in relation to individual ones of the speed cameras.

In step 30 the duration time data is used to obtain a single duration time function indicative of the variation in duration time with respect to time based upon the data indicative of the multiple duration times. In other words, the data indicative of multiple individual duration times is aggregated to provide an overall duration time function indicative of the variation in duration time with respect to time. This may involve determining a distribution of the duration times with respect to time, and then carrying out some form of averaging of the duration times in respect of particular times or time slots, such as determination of a statistical mean or median duration time, in order to obtain a single value of duration time for each time. In some embodiments deriving the duration time function may involve creating one or more histogram indicative of the distribution of the duration times, and using the histogram in obtaining the duration time function. Duration times may be assigned to bins indicative of certain increments of duration time, e.g. every 15 minutes to obtain the histogram. A histogram may be obtained in respect of each of a plurality of different times, e.g. timeslots, such as hours of the day or days of the week, etc. Further information regarding the duration time function, and possible features thereof, is described below.

The duration time function is indicative of how the duration time varies with respect to time. This enables a duration time to be identified for any time of interest. The time may by reference to a current time or an activation time. It has been found that the variation in duration time of a speed camera with respect to time, or indeed other types of dynamical POI, typically is periodical in nature. In other words, the variation exhibits a pattern that repeats with a given period. The period may depend upon the nature of the POI or speed camera. Typical repeat periods have been found to be one day, or one week or working week. The duration time function may therefore be in respect of a particular period, such as a week or day. Duration times may be considered to relate to the relevant time of day, or day of the week, even if they relate to different incidences of that particular time of day or day of week.

Once the duration time function has been determined, data indicative of the duration time function is associated with data indicative of a geographic region—step 40. The geographic region provides location data associated with the duration time function. The geographic region is a region to which the duration time function is considered applicable. The duration time function may then be used to obtain a duration time for a new speed camera associated with that region. The geographical region is a region over which it is considered that the duration time function will adequately describe the time variation of duration times associated with speed cameras of the region. The region is determined based upon the locations of the speed cameras of the set whose duration time data is used to obtain the duration time function. The region may be a region which includes each of the locations of the speed cameras of the sets. Where the set of speed cameras was initially obtained by clustering speed cameras having locations in a particular region, that same region may be used as the region that is then associated with the duration time function. Of course, the location data associated with a duration time function may instead be a point location in some contexts, rather than a region.

Where a duration time function is specific to speed cameras having one or more additional attributes, e.g. type, functional road class, etc, data indicative of each additional attribute may also be associated with the duration time function. This may be the case where the duration time function has been obtained using duration data relating to speed cameras having certain similar attributes. These attributes may correspond to attributes used in a clustering process to obtain the set of speed cameras used to obtain the duration time function.

The duration time function data and its associated region data is then stored in a duration time function database 520—step 50. This may involve storing data indicative of the region with the duration time function associated therewith as an attribute. The duration time function may undergo discretization and/or compression prior to storage as described below. Of course, the duration time function database may be stored on a separate server. The database may be linked to, or form part of the speed camera database 516.

These steps are carried out for each set of speed cameras that was obtained in step 10 to provide a plurality of duration time functions and associated location data which are stored in the database 520.

It will be appreciated that by taking into account duration times associated with different ones of sets of speed cameras with at least similar location, a larger set of duration time data is obtained for use in determining a duration time function. This avoids the need to have significant amounts of data relating to any particular speed camera. However, in other embodiments, rather than clustering speed cameras into groups of similarly located speed cameras, a duration time function may be obtained using data indicative of multiple duration times relating to a single speed camera. This may be possible where sufficient data relating to the speed camera, i.e. active and inactive times, is present in the database. Determination of a duration time function in these embodiments will proceed in the same manner described by reference to sets of multiple cameras, based upon the plurality of duration times relating, in this case, to the single speed camera.

Figure 6:
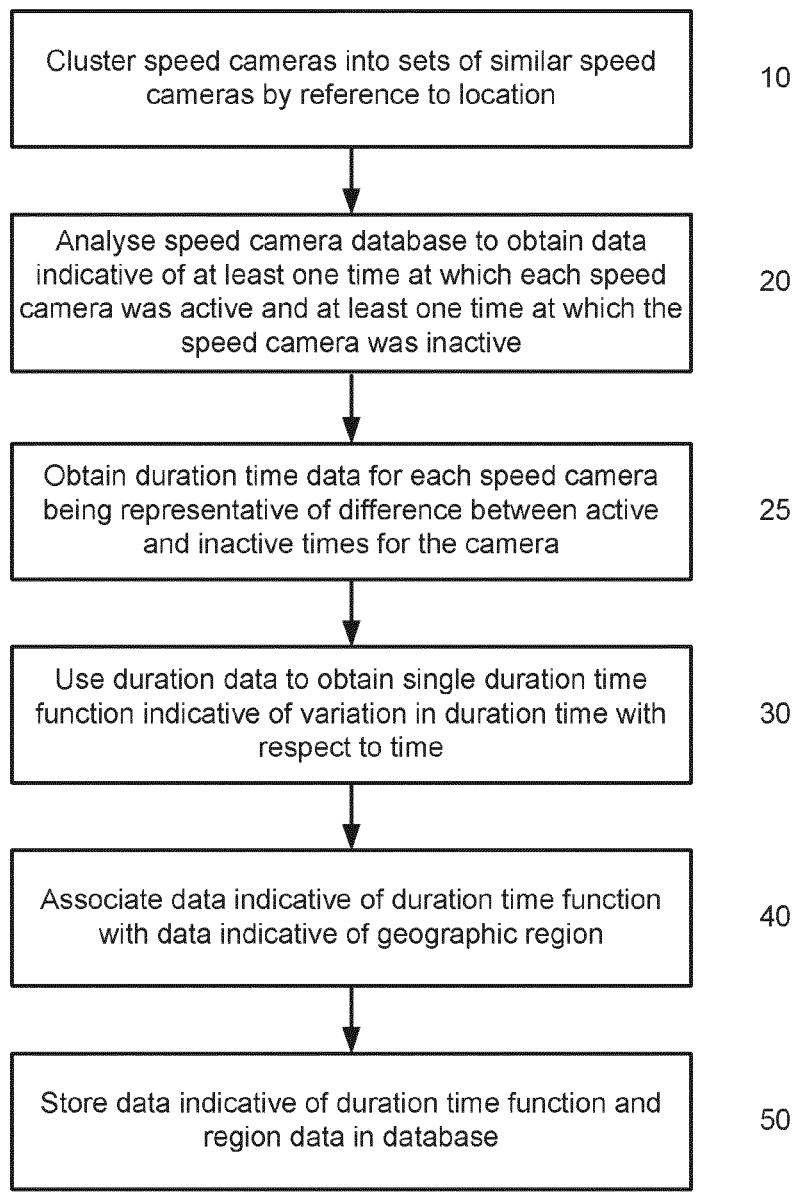
FIG. 6 shows the steps of a method according to an embodiment of the invention for obtaining a duration time function.

The result of the method described by reference to FIG. 6 is a database 520 of duration time function data, with its associated location data. Data indicative of each duration time function may be stored as an attribute associated with data indicative of its applicable geographic region. In any event, by associating a duration time function with a geographic region, the need to incorporate any location dependence in the function itself is removed. The duration time function may depend upon only non-spatial parameters. This may allow the regions to be more easily visualised. It has been found that the regions may be chosen to be relatively large, as there may not be sufficient data relating to active and inactive times of speed cameras to provide higher levels of resolution. This may also facilitate storage of the data.

Figure 7:
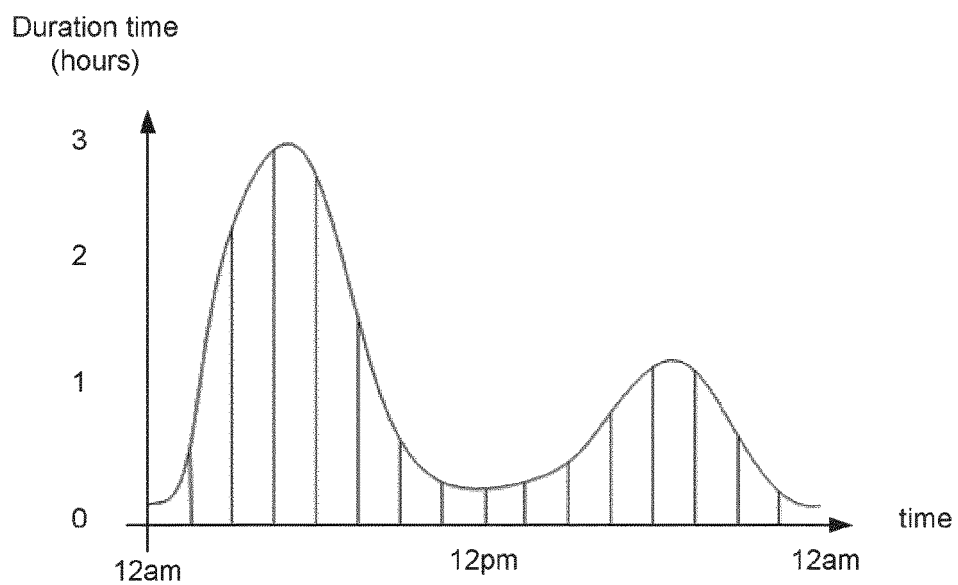
FIG. 7 shows an example of a duration time function according to an embodiment of the invention.

One example of duration time function is illustrated in FIG. 7. This shows variation in duration time d(t) (vertical axis) with time (horizontal axis). The duration time is the time spent in an active state. The function illustrates how this varies depending upon time of activation. In this example, which has a period of 1 day, the duration time exhibits two peaks, which correspond to morning and evening peak times. The time in this figure is an activation time. Thus, the function may be used to look up a duration time based upon a planned activation time. In accordance with this function, a speed camera activated in the morning or afternoon peak time will have a longer duration than a speed camera activated before or after these times. The function indicates a zero duration associated with some times. This may be indicative of no reports having been received indicating the camera being in an active state at these times. It will be seen that FIG. 7 illustrates the duration function as a continuous function, as well as illustrating samples which may be taken at equidistant points in order to discretize the function to facilitate storage in some embodiments as described in more detail below.

Figure 8:
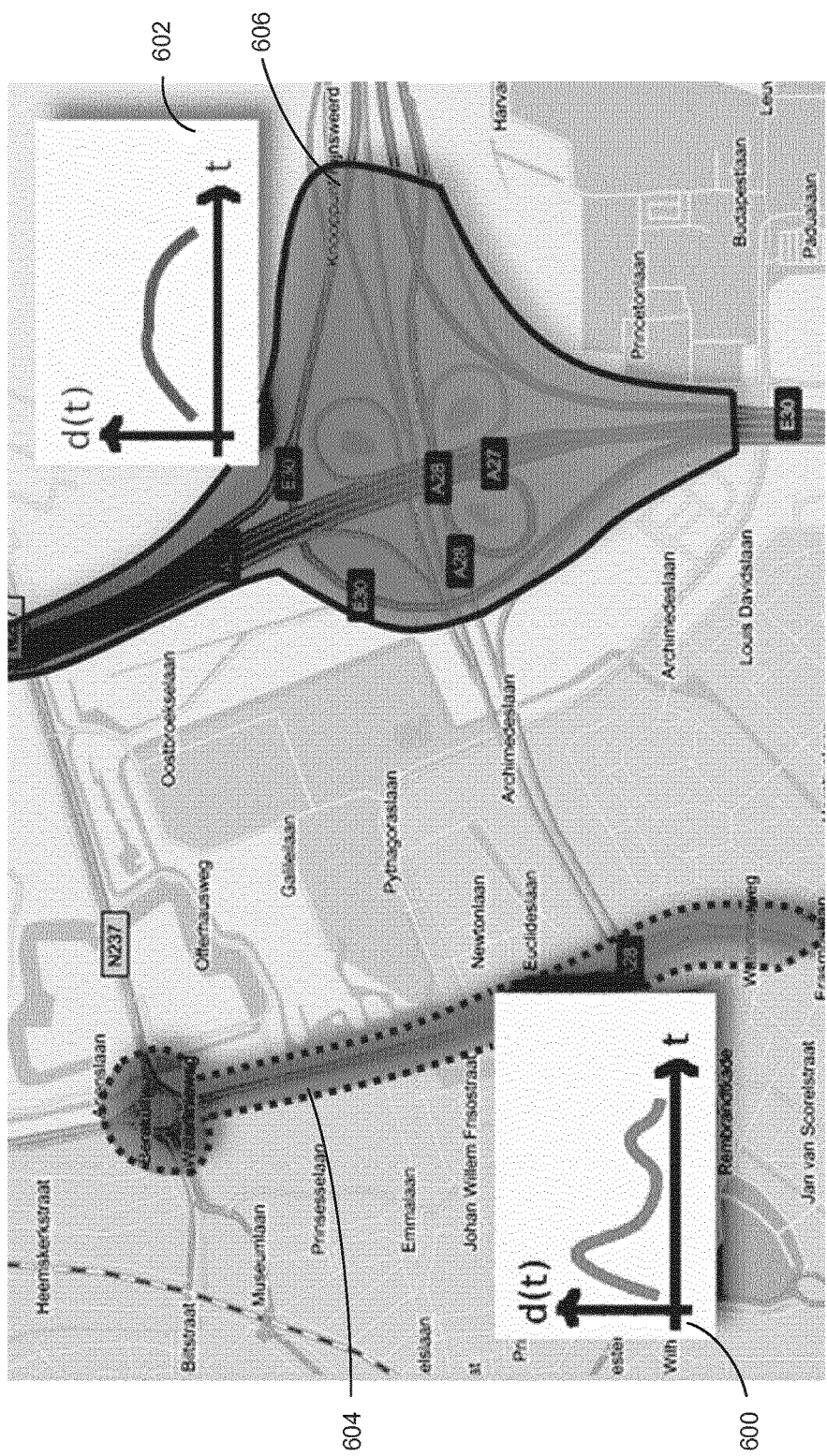
FIG. 8 shows an example of duration time functions for different regions according to an embodiment of the invention.

FIG. 8 illustrates two exemplary duration functions 600, 602, and their associated regions 604, 606. Thus, any speed camera having a location in the region 604 may be assumed to have a duration function according to 600, while a speed camera in region 606 would be expected to have a duration function as shown in FIG. 602. If a new speed camera is created in region 604 or 606 respectively, the duration time for the camera is taken from the duration function associated with the applicable region. The duration functions 600, 602 may be seen to differ significantly. Assuming these have a period of 1 day, function 600 can be seen to exhibit peaks in duration time, e.g. at morning and afternoon peak times, with function 602 exhibiting a broad plateau in the middle of the day. Thus in accordance with duration function 600, speed cameras created at early morning hours endure much longer than in the middle of the day, while there is another peak in the evening. According to duration function 602, however, speed cameras in the middle of the day are more persistent than in the early morning and evening hours.

Some examples of the way in which data indicative of a continuous duration time function may be discretized, and optionally compressed, prior to storage will now be discussed.

Prior to storage of a duration function in a database, the function may be discretized. This may facilitate storage of a determined continuous function. This could be achieved by simply sampling the function with equidistant sample points. However, maintaining a desired high resolution sampling of a time-based function may necessitate storing an undesirably high number of data points. In order to reduce the amount of data that needs to be stored in a database of duration function data, the duration function may be compressed. It is expected that for a particular type of dynamic POI e.g. mobile speed cameras, there will be only a limited number of significantly different functions. The sampled functions may be described in terms of vectors, and an orthogonal basis established in the vector space of the sampled duration functions. This may be achieved using Principal Component Analysis (PCA). PCA may help to not only find the orthogonal basis, but also to rate the basis vectors among their importance. This enables a limited set of basis vectors to be determined from which at least an approximation of each sampled duration function may be reconstructed.

Establishing such a basis may be done as follows. At first, a large set of duration functions is obtained, each indicative of variation in duration time with respect to time. Time in this case is understood as some periodicity, may it be a day, a week or a year. The longer the period, the more data points are necessary to estimate with significance. The test set of duration functions must be as large enough as it can be assume that it contains all principally different duration functions, which means, there are unlikely to be other duration functions that cannot be synthesized out of linear combinations of the duration functions in the test set.

When the test set is complete, PCA is performed, involving computing the covariance matrix of all sampled duration functions in the test set, and subsequently computing the eigenvalues and eigenvectors of the covariance matrix. The eigenvectors will be ordered among their eigenvalues in descending order. Since the amount of principally different duration functions is believed to be small, a limited number of the top eigenvalues may provide reasonable basis, such that all duration functions in the test set can be approximated by linear combinations of the basis vectors.

The methods of discretization and compression have been described in relation to the preferred case in which the duration function depends only upon time, and not other parameters. Of course, similar techniques may be applied where the duration function depends upon further parameters, resulting in higher dimensionality.

As will be appreciated, while the above description was in respect of speed limit enforcement devices, the principles of the invention can relate to any type of dynamic point of interest (POI). For example, a parking space may be a dynamic POI, wherein an active state indicates that the parking space is considered vacant, and an inactive state indicates that the parking space is considered filled. In other embodiments, weather or other environmental conditions can be considered dynamic POIs. For example, a region of black ice or flooding may be a dynamic POI, wherein an active state indicates the black ice or flooding is considered present, and an inactive state indicates that the black ice or flooding is no longer considered present. In yet other embodiments, traffic jams can also be considered dynamic POIs.

Operation in relation to these other types of dynamic POI would proceed in the manner described by reference to speed cameras. Where a database includes data relating to multiple types of dynamic POI, clustering of the POI to obtain sets of POI for which duration time functions are derived may additionally take into account the type of POI in order to provide sets of POIs of a similar type. Data indicative of the type of POI may be associated with the resulting duration time function.

The nature of a location of a dynamic POI may differ depending upon the nature of the POI. For example, in some situations, e.g. where the POI is an area affected by a weather or environmental event, the location may be defined by a shape, such as a polygon or circle. In other contexts, the location of a POI may be a point location, e.g. a single coordinate, or a road stretch. Any data indicative of a location, e.g. a location of a dynamic POI, e.g. speed camera, or a location associated with a duration time function may be in terms of a map agnostic location referencing system, e.g. an OpenLR® location, or by reference to an applicable electronic map.

Figure 9:
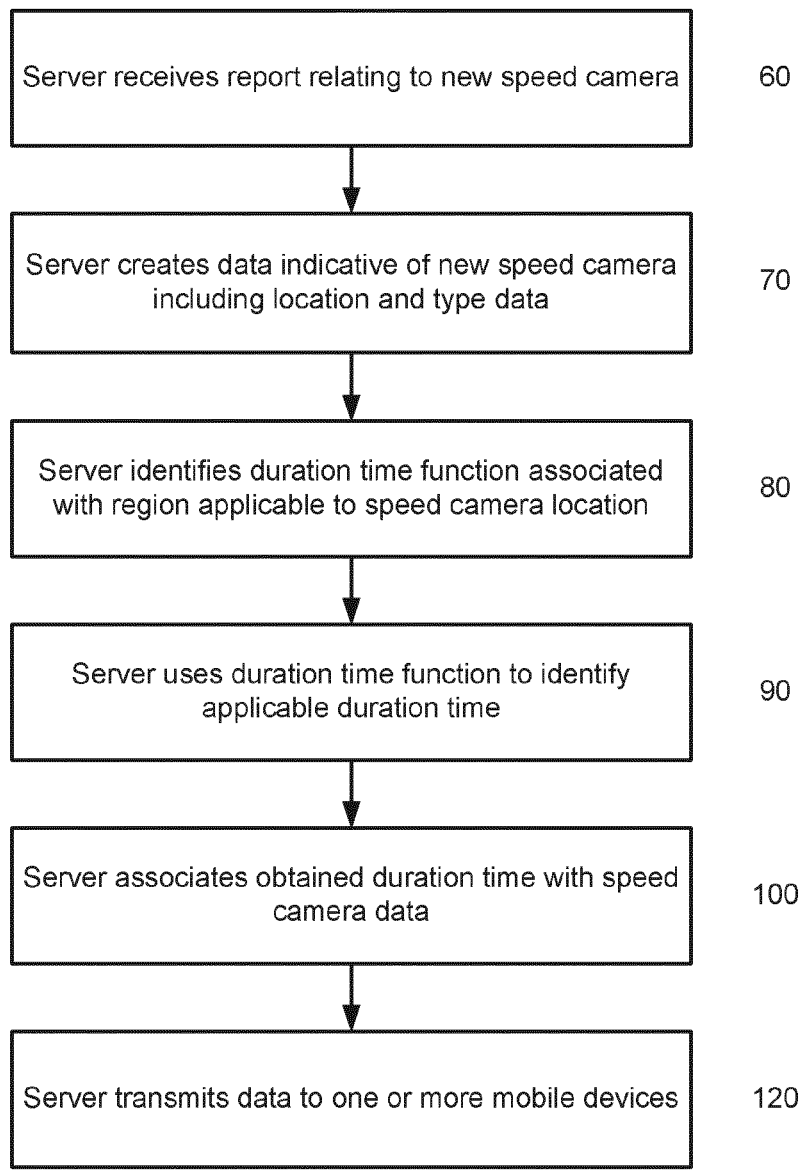
FIG. 9 shows the steps of a method for using a duration time function according to an embodiment of the invention.

The present invention also extends to methods of using a database storing distribution function data and associated location data obtained in accordance with the methods described by reference to FIGS. 5-8. FIG. 9 illustrates one embodiment of such a method.

The server 302 receives a report relating to a new speed camera that is not yet part of the database—step 60. This includes data relating to the location of the speed camera. This is passed to the fusion engine 510, and once it has been appropriately verified or corroborated, if required, it is determined that the speed camera should be added to the database 516. Thus, it may be decided to add the speed camera to the database upon receipt of one user report relating thereto, or after a certain number have been received, or other corroborating evidence received, as described above.

The server creates data indicative of the new speed camera including data relating to the location thereof, and one or more attributes, e.g. type—step 70. This may be stored in the speed camera database. The server also needs to obtain a duration time for the new speed camera indicative of how long the camera should remain active once activated.

In order to obtain the duration data, the server interrogates the duration function database using the location data for the speed camera. The server identifies a duration time function associated with a region that is applicable to the location of the speed camera—step 80. This may be a region that includes the location of the speed camera. If no such region exists, then it may be determined whether there is a region associated with a duration time function which at least partially overlaps a location of the speed camera.

In step 90 the server uses the duration time function to identify a duration time that is applicable to the planned activation time of the speed camera. This may be done by simply looking up the duration time corresponding to the planned activation time.

In step 100 the obtained duration time is associated with the data indicative of the new speed camera. The data may be stored in the speed camera database (step 120) and/or transmitted to one or more of the mobile devices 200. The data may be transmitted to mobile devices to which the data is relevant e.g. having locations in the vicinity of the new speed camera, or travelling along a route that will pass the speed camera or similar. Thus, the duration time function data provides a way of obtaining an expected duration time for a speed camera for a time of interest based upon its location. It will be appreciated that if the duration function data has been compressed, it may be necessary to carry out some reconstruction of the function to obtain a duration time. This may involve synthesizing the function as a linear composition of duration function basis vectors in some embodiments.

In this regard, whilst embodiments described in the foregoing detailed description refer to GPS, it should be noted that the mobile devices 200, e.g. navigation apparatus, may utilise any kind of position sensing technology as an alternative to, or indeed in addition to, GPS. For example, the navigation apparatus may utilise other global navigation satellite systems, such as the European Galileo system. Equally, it is not limited to satellite-based systems, but could readily function using ground-based beacons or other kind of system that enables the device to determine its geographic location.

Due to the nature of speed enforcement devices, e.g. new fixed speed cameras are continually being installed, fixed speed cameras may be moved to a new location, mobile speed cameras will often be in operation for short periods of time, etc, the information in the database on the server 302 needs to be constantly refreshed to ensure that it is accurate and up to date. The techniques according to embodiments are therefore preferably repeated at regular intervals, and/or the duration time functions for a POI continuously updated as reports of its active and inactive states are received.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

As a modification of the above described techniques, embodiments also include dynamic POIs that have more than two states, such as a traffic jam being described as highly congested, moderately congested and not congested. The above described techniques may be applied to any pair or pairs of states of the POI.

The duration function of a POI has be described as providing a time dependent function. The duration function may also provide a higher dimension model that is a function of other factors.

It will be appreciated that whilst various aspects and embodiments of the present invention have heretofore been described, the scope of the present invention is not limited to the particular arrangements set out herein and instead extends to encompass all arrangements, and modifications and alterations thereto.

Lastly, it should be noted that whilst the accompanying claims set out particular combinations of features described herein, the scope of the present invention is not limited to the particular combinations hereafter claims, but instead extends to encompass any combination of features or embodiments herein disclosed irrespective of whether or not that particular combination has been specifically enumerated in the accompanying claims at this time.

The invention claimed is:

1. A method of obtaining data indicative of a duration time for a dynamic POI, the duration time being a time that the dynamic POI remains in a first state before changing to a second state following initiation of the first state, the method comprising:

creating data indicative of the dynamic POI in response to receiving data indicative of the existence of the dynamic POI;

obtaining data identifying a geographic location of the dynamic POI;

accessing a database storing data indicative of a plurality of duration time functions, each duration time function being associated with data indicative of a given geographic region, and each duration time function being indicative of a variation in duration time with respect to time of dynamic POIs of a set of one or more dynamic POIs, wherein the dynamic POIs of the set of one or more dynamic POIs are associated with data indicative of the given geographic region, wherein the variation in duration time of each duration time function is determined based on obtained data indicative of a plurality of duration times, in respect of a given time, for the respective set of one or more dynamic POIs associated with data indicative of the given respective geographic region;

selecting, from the stored plurality of duration time functions, a duration time function based on the geographic location of the dynamic POI such that the selected duration time function's associated given geographic region includes the geographic location of the dynamic POI;

obtaining the data indicative of the duration time for the dynamic POI using the selected duration time function to determine a duration time for the dynamic POI for a time of interest;

associating the obtained data indicative of the duration time with the created data indicative of the dynamic POI; and transmitting, to one or more remote devices, the obtained data indicative of the duration time for the dynamic POI and information to enable the one or more remote devices to identify a type and location of the dynamic POI.

2. The method of claim 1, wherein the time of interest is a current time, a time at which the first state of the dynamic POI is to be initiated, or a time of creation of the POI.

3. The method of claim 1, wherein the database stores data indicative duration time functions specific to dynamic POIs having one or more particular attributes, each duration time function being associated with data indicative of a geographic location, wherein the one or more particular attributes include at least a type of the dynamic POI, and the step of obtaining the data indicative of the duration time for the dynamic POI comprises using data indicative of the type of the dynamic POI to identify data indicative of a duration time function that is in respect of dynamic POIs of the same or similar type as the dynamic POI, and which is associated with data indicative of a geographic location applicable to the location of the dynamic POI, and using the duration time function to identify the duration time for the dynamic POI for a time of interest.

4. The method of claim 1, wherein the first and second states are active and inactive states of the dynamic POI respectively.

5. The method of claim 1, wherein the or each dynamic POI is selected from: a speed limit enforcement device, a parking space or area, a traffic jam, an electric vehicle charging station, an area of construction or roadworks, dynamic signage, or an area affected by weather or other environmental condition.

6. The method of claim 1, wherein the data indicative of a plurality of duration times is based upon one or more of: user reports, third part data, image data, or data indicative of the speed of one or more vehicles in the vicinity of the location of the dynamic POI.

7. The method of claim 1, wherein each of the plurality of duration time functions is in respect of dynamic POIs of a particular type.

8. The method of claim 1, wherein each of the duration time functions is indicative of the variation in duration time of the set of one or more POIs with respect to time for a given time period, optionally wherein the time period is one of: a week, a working week, or a day.

9. A system for obtaining data indicative of a duration time for a dynamic POI, the duration time being a time that the dynamic POI remains in a first state before changing to a second state following initiation of the first state, the system comprising:

a processor and a data repository, the processor and data repository performing operations for:

creating data indicative of the dynamic POI in response to receiving data indicative of the existence of the dynamic POI;

obtaining data identifying a geographic location of the dynamic POI;

accessing a database storing data indicative of a plurality of duration time functions, each duration time function being associated with data indicative of a given geographic region, and each duration time function being indicative of a variation in duration time with respect to time of dynamic POIs of a set of one or more dynamic POIs, wherein the dynamic POIs of the set of one or more dynamic POIs are associated with data indicative of the given geographic region, wherein the variation in duration time of each duration time function is determined based on obtained data indicative of a plurality of duration times, in respect of a given time, for the respective set of one or more dynamic POIs associated with data indicative of the given respective geographic region;

selecting, from the stored plurality of duration time functions, a duration time function based on the geographic location of the dynamic POI such that the selected duration time function's associated given geographic region includes the geographic location of the dynamic POI;

obtaining the data indicative of the duration time for the dynamic POI using the selected duration time function to determine a duration time for the dynamic POI for a time of interest;

associating the obtained data indicative of the duration time with the created data indicative of the dynamic POI; and transmitting, to one or more remote devices, the obtained data indicative of the duration time for the dynamic POI and information to enable the one or more remote devices to identify a type and location of the dynamic POI.

10. The system of claim 9, wherein the time of interest is a current time, a time at which the first state of the dynamic POI is to be initiated, or a time of creation of the POI.

11. The system of claim 9, wherein the database stores data indicative duration time functions specific to dynamic POIs having one or more particular attributes, each duration time function being associated with data indicative of a geographic location, wherein the one or more particular attributes include at least a type of the dynamic POI, and the step of obtaining the data indicative of the duration time for the dynamic POI comprises using data indicative of the type of the dynamic POI to identify data indicative of a duration time function that is in respect of dynamic POIs of the same or similar type as the dynamic POI, and which is associated with data indicative of a geographic location applicable to the location of the dynamic POI, and using the duration time function to identify the duration time for the dynamic POI for a time of interest.

12. The system of claim 9, wherein the data indicative of a plurality of duration times is based upon one or more of: user reports, third part data, image data, or data indicative of the speed of one or more vehicles in the vicinity of the location of the dynamic POI.

13. The system of claim 9, wherein each of the plurality of duration time functions is in respect of dynamic POIs of a particular type.

14. The system of claim 9, wherein each of the duration time functions is indicative of the variation in duration time of the set of one or more POIs with respect to time for a given time period, optionally wherein the time period is one of: a week, a working week, or a day.

15. A non-transitory computer-readable storage medium storing instructions that, when executed by a computing device comprising one or more processors and a data repository, cause the computing device to perform a method for obtaining data indicative of a duration time for a dynamic POI, the duration time being a time that the dynamic POI remains in a first state before changing to a second state following initiation of the first state, the method comprising:

creating data indicative of the dynamic POI in response to receiving data indicative of the existence of the dynamic POI;

obtaining data identifying a geographic location of the dynamic POI;

accessing a database storing data indicative of a plurality of duration time functions, each duration time function being associated with data indicative of a given geographic region, and each duration time function being indicative of a variation in duration time with respect to time of dynamic POIs of a set of one or more dynamic POIs, wherein the dynamic POIs of the set of one or more dynamic POIs are associated with data indicative of the given geographic region, wherein the variation in duration time of each duration time function is determined based on obtained data indicative of a plurality of duration times, in respect of a given time, for the respective set of one or more dynamic POIs associated with data indicative of the given respective geographic region;

selecting, from the stored plurality of duration time functions, a duration time function based on the geographic location of the dynamic POI such that the selected duration time function's associated given geographic region includes the geographic location of the dynamic POI;

obtaining the data indicative of the duration time for the dynamic POI using the selected duration time function to determine a duration time for the dynamic POI for a time of interest;

associating the obtained data indicative of the duration time with the created data indicative of the dynamic POI; and transmitting, to one or more remote devices, the obtained data indicative of the duration time for the dynamic POI and information to enable the one or more remote devices to identify a type and location of the dynamic POI.

16. The non-transitory computer-readable storage medium of claim 15, wherein the time of interest is a current time, a time at which the first state of the dynamic POI is to be initiated, or a time of creation of the POI.

17. The non-transitory computer-readable storage medium of claim 15, wherein the database stores data indicative duration time functions specific to dynamic POIs having one or more particular attributes, each duration time function being associated with data indicative of a geographic location, wherein the one or more particular attributes include at least a type of the dynamic POI, and the step of obtaining the data indicative of the duration time for the dynamic POI comprises using data indicative of the type of the dynamic POI to identify data indicative of a duration time function that is in respect of dynamic POIs of the same or similar type as the dynamic POI, and which is associated with data indicative of a geographic location applicable to the location of the dynamic POI, and using the duration time function to identify the duration time for the dynamic POI for a time of interest.

18. The non-transitory computer-readable storage medium of claim 15, wherein the data indicative of a plurality of duration times is based upon one or more of: user reports, third part data, image data, or data indicative of the speed of one or more vehicles in the vicinity of the location of the dynamic POI.

19. The non-transitory computer-readable storage medium of claim 15, wherein each of the plurality of duration time functions is in respect of dynamic POIs of a particular type.

20. The non-transitory computer-readable storage medium of claim 15, wherein each of the duration time functions is indicative of the variation in duration time of the set of one or more POIs with respect to time for a given time period, optionally wherein the time period is one of: a week, a working week, or a day.

* * * * *